(12) United States Patent
Marshall et al.

(10) Patent No.: US 11,417,236 B2
(45) Date of Patent: Aug. 16, 2022

(54) REAL-TIME LANGUAGE LEARNING WITHIN A SMART SPACE

(71) Applicant: Intel Corporation, Santa Clara, CA (US)

(72) Inventors: Carl S. Marshall, Portland, OR (US); Giuseppe Raffa, Portland, OR (US); Shi Meng, Hillsboro, OR (US); Lama Nachman, Santa Clara, CA (US); Ankur Agrawal, Portland, OR (US); Selvakumar Panneer, Portland, OR (US); Glen J. Anderson, Beaverton, OR (US); Lenitra M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 16/235,448

(22) Filed: Dec. 28, 2018

(65) Prior Publication Data

US 2019/0139448 A1 May 9, 2019

(51) Int. Cl.
*G09B 19/06* (2006.01)
*G09B 7/02* (2006.01)
*G06F 16/907* (2019.01)
*G06F 16/9035* (2019.01)
*G06F 40/30* (2020.01)
*G06V 20/20* (2022.01)

(52) U.S. Cl.
CPC ............ *G09B 19/06* (2013.01); *G06F 16/907* (2019.01); *G06F 16/9035* (2019.01); *G06F 40/30* (2020.01); *G06V 20/20* (2022.01); *G09B 7/02* (2013.01)

(58) Field of Classification Search
None
See application file for complete search history.

(56) References Cited

U.S. PATENT DOCUMENTS

| | | | |
|---|---|---|---|
| 2007/0015121 A1* | 1/2007 | Johnson | G09B 7/04 434/156 |
| 2008/0131851 A1* | 6/2008 | Kanevsky | G09B 19/06 434/157 |
| 2014/0234811 A1* | 8/2014 | Paul | G09B 5/04 434/185 |
| 2015/0081302 A1* | 3/2015 | Syrdal | G06K 9/00335 704/249 |
| 2015/0206440 A1* | 7/2015 | Aylesworth | G09B 7/04 434/362 |
| 2016/0078512 A1* | 3/2016 | Yopp | G06Q 30/0617 705/26.41 |

(Continued)

*Primary Examiner* — Nathan Hillery
(74) *Attorney, Agent, or Firm* — Hanley, Flight & Zimmerman, LLC

(57) ABSTRACT

Language education systems capable of integrating with a user's daily life and automatically producing educational prompts would be particularly advantageous. An example method includes determining a user's identity, detecting a language education subject, prompting the user with a language education message, receiving a user's response, and updating a user profile associated with the user based on the user's response. Methods may also include determining user state (including emotional, physical, social, etc.) and determining, based on the user state, whether to prompt the user with the language education prompt.

17 Claims, 15 Drawing Sheets

(56) References Cited

U.S. PATENT DOCUMENTS

| | | | |
|---|---|---|---|
| 2016/0086090 A1* | 3/2016 | Tur | G06N 7/005 |
| | | | 706/46 |
| 2016/0293024 A1* | 10/2016 | Kozloski | G06Q 10/109 |
| 2016/0352907 A1* | 12/2016 | Raanani | G06N 20/00 |
| 2017/0206095 A1* | 7/2017 | Gibbs | G06F 3/011 |
| 2017/0263251 A1* | 9/2017 | Jin | G10L 17/22 |
| 2017/0346817 A1* | 11/2017 | Gordon | G06K 9/00885 |
| 2018/0122266 A1* | 5/2018 | Azartash | G09B 5/04 |
| 2018/0232902 A1* | 8/2018 | Albadawi | A61B 5/0205 |
| 2019/0027129 A1* | 1/2019 | Wang | G10L 15/22 |
| 2019/0122574 A1* | 4/2019 | Amin | G09B 19/04 |
| 2019/0237076 A1* | 8/2019 | Lovitt | G10L 15/22 |
| 2019/0391640 A1* | 12/2019 | Prokofieva | G02B 27/0093 |
| 2020/0074179 A1* | 3/2020 | Murata | G06F 40/00 |
| 2020/0098362 A1* | 3/2020 | Piernot | G06F 3/167 |
| 2020/0168113 A1* | 5/2020 | Rodriguez Bravo | G10L 15/22 |
| 2020/0168120 A1* | 5/2020 | Rodriguez Bravo | G06F 40/205 |
| 2021/0005097 A1* | 1/2021 | Fitzpatrick-Nash | G06F 3/0486 |

\* cited by examiner

← 800

CONTEX DETERMINATION CKTRY 114

DATA REPRESENTATIVE OF EMOTIONAL STATE 810
- ANGRY?
- DISTRACTED?
- BORED?

DATA REPRESENTATIVE OF SOCIAL STATE 820
- HOLDING CONVERSATION?
- NUMBER OF USERS PRESENT?
- LANGUAGE SKILL OF OTHER USER(S)?
- LANGUAGE BARRIER?

DATA REPRESENTATIVE OF PHYSICAL STATE 830
- TIRED / ASLEEP?
- ENERGETIC?

DATA REPRESENTATIVE OF PHYSICAL STATE 840
- AMOUNT OF EDUCATION PERFORMED RECENTLY?
- RECENT SUCCESS RATE?
- OVERALL SKILL LEVEL?
- RECENT SKILL TREND?

FIG. 8

REAL-TIME LANGUAGE LEARNING WITHIN A SMART SPACE

TECHNICAL FIELD

The present disclosure relates to smart space technology, particularly with reference to language education.

BACKGROUND

Language education has traditionally been an intensive undertaking. Learning a new language can be very rewarding but it is a difficult and time-consuming task. If a person lives in a multi-lingual household with children, it may be the case that one of the parents does not speak the natural language of the other parent. The issue is that there are no real-time interactive systems today that can assist language learning in the household for the above scenario.

While several attempts have been made to support learning a new language via technology, these have resulted in varying degrees of success. To learn a new language, one must typically either dedicate themselves to intensive study or immerse themselves in a culture speaking the language, and often both. For many, these are not feasible. In particular, immersion in the language generally requires moving, often to a foreign nation.

Today, people use software programs, enroll in online or in-person classes, or they can visit a country that natively speaks the desired language to learn. Many of these techniques take a lengthy period of time and are not integrated into the person's daily life or accessible in real-time.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 8 depicts an illustrative data structure used by the context determination circuitry in assessing one or more contextual factors included in the information provided by the sensors, in accordance with at least one embodiment described herein;

Figure 1:
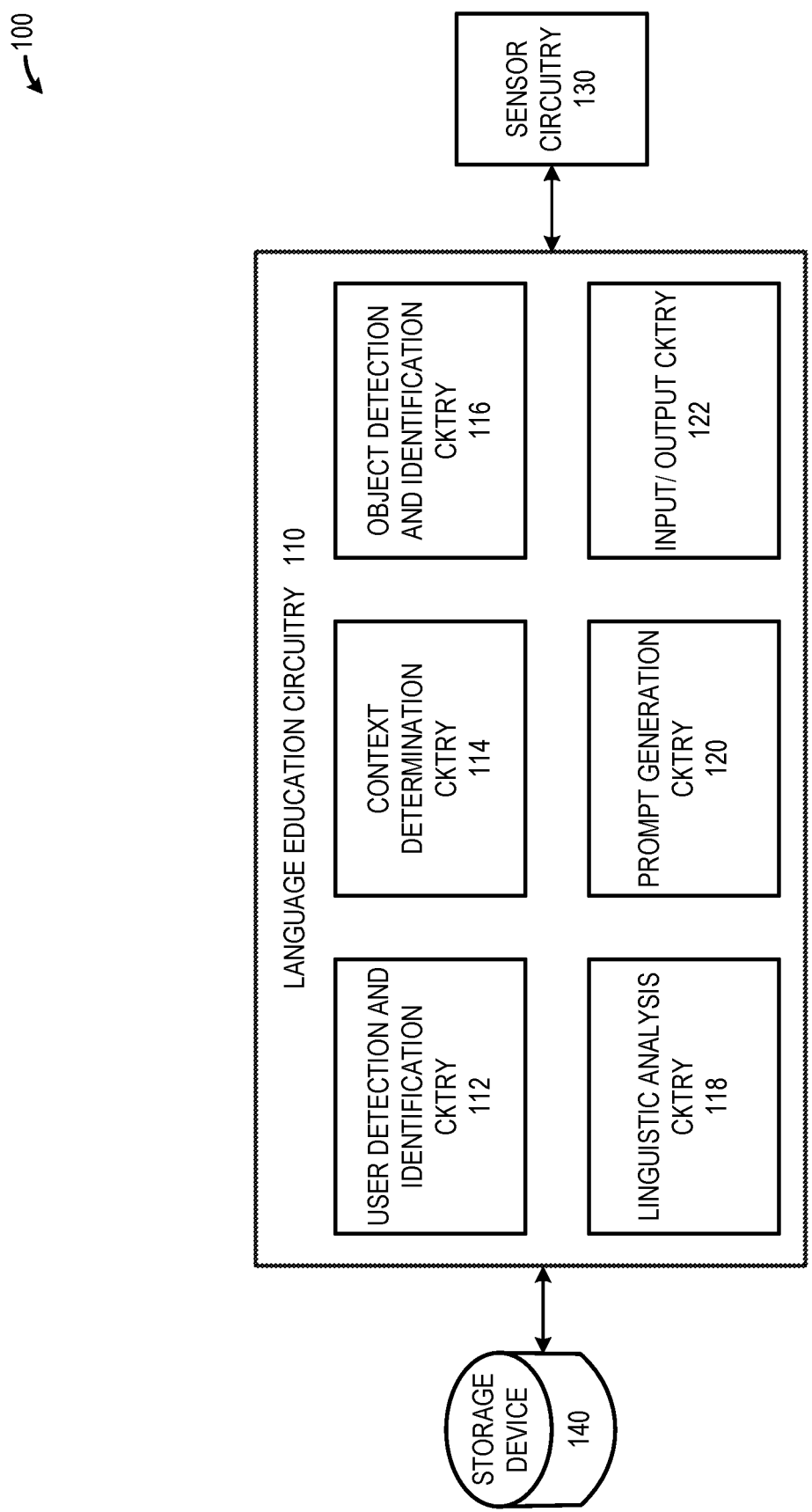
FIG. 1 is a block diagram of an illustrative language education system that includes language education circuitry, sensor circuitry and one or more storage devices, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Language education systems capable of integrating with a user's daily life and automatically producing educational prompts would be particularly advantageous. An example method includes determining a user's identity, detecting a language education subject, prompting the user with a language education message, receiving a user's response, and updating a user profile associated with the user based on the user's response. Methods may also include determining user state (including emotional, physical, social, etc.) and determining, based on the user state, whether to prompt the user with the language education prompt.

A language education system is provided. The system may include: I/O interface circuitry to receive sensor information and provide a second language education output; context determination circuitry to determine a second language context based on the received sensor information; linguistic analysis circuitry to initiate a second language education event using the received sensor information and the determined second language context; and prompt generation circuitry to generate the second language education output based on the received sensor information and the determined context.

A non-transitory storage device is provided. The non-transitory storage device includes machine-readable instructions that, when executed by language education circuitry may cause the language education circuitry to: receive sensor information responsive to a request to initiate a second language education event; determine a second language context based on the received sensor information; initiate a second language education event using the received sensor information and the determined second language context; and generate a second language education output based on the received sensor information and the determined context.

A language education system is provided. The system may include: means for receiving sensor information; means for determining a second language context based on the received sensor information; means for initiating a second language education event using the received sensor information and the determined second language context; means for generating a second language education output based on the received sensor information and the determined context; and means for providing the second language education output.

A language education method is provided. The method may include: receiving, by I/O interface circuitry, sensor information; determining, by context determination circuitry, a second language context based on the received sensor information; initiating, by linguistic analysis circuitry, a second language education event using the received sensor information and the determined second language context; generating, by prompt generation circuitry, a second language education output based on the received sensor information and the determined context; and providing, via the I/O interface circuitry the second language education output.

A processor-based electronic device that includes a language education system is provided. The device may include: processor circuitry; one or more sensors; and language education circuitry coupled to the processor circuitry and the one or more sensors, the language education circuitry including: I/O interface circuitry to receive sensor information and provide a second language education output; context determination circuitry to determine a second language context based on the received sensor information; linguistic analysis circuitry to initiate a second language education event using the received sensor information and the determined second language context; and prompt generation circuitry to generate the second language education output based on the received sensor information and the determined context.

As used herein the term "first language" refers to the language with which the system user is most fluent. Typically such "first language" may be considered the system user's "native language." As used herein, the term "second language" should be understood to refer to a language with which the system user is relatively less fluent and in which the system user seeks to improve proficiency. For example, for a native English speaking system user seeking to improve efficiency in Spanish, English would be considered the user's "first language" and Spanish would be considered the user's "second language."

FIG. 1 is a block diagram of an illustrative language education system 100 that includes language education circuitry 110, sensor circuitry 130 and one or more storage devices 140, in accordance with at least one embodiment described herein. In embodiments, the language education system 100 uses information obtained by the sensor circuitry 130 to detect and/or identify one or more objects and/or activities in the environment about a user. The language education system 100 then autonomously provides a user perceptible output associated with the detected object or activity thereby providing an engaging and immersive learning environment in which a "language instructor" continuously accompanies the user and provides linguistic feedback to the user based on the occurrence of events and presence of objects within the user's environment.

The language education system 100 thus autonomously provides contextually relevant linguistic feedback to a user in either (or both) the user's first, or native, language and a second, language that the user seeks to gain proficiency. Such contextually relevant linguistic feedback may be delivered in the form of user perceptible (e.g., audible, visible) prompts to the user. Such prompts may include, for example, questions, instructions, requests, and/or information that is relevant to objects, activities, and other persons present in the local environment about the user. Such prompts permit the user to gain proficiency in multiple aspects of a second language (vocabulary, grammar, conjugations, etc.) while being minimally invasive in the user's daily activities. For example, the prompts may be based on automatically determined context, such as an action the user or another person in the local environment is performing (or has recently performed), advantageously promoting smart-environment-based language learning (i.e., with reduced requirement for intensive, dedicated study or relocation).

The language education circuitry 110 includes user detection/identification (ID) circuitry 112 to detect and/or identify the system user and/or other persons in the environment proximate the system user, context determination circuitry 104 to assess and identify contextual information associated with the environment about the user, subject determination circuitry 106 to identify one or more objects or actions on which to base a prompt, linguistic analysis circuitry 108 to determine appropriate language education operations, prompt generation circuitry 110 to generate a language education prompt, input/output (I/O) circuitry 112 to present the prompt to the user(s) and receive a user response, and language validation circuitry 114 to control further operations (such as, for example, determining accuracy of response, updating user information, providing feedback) based on the user response.

In embodiments, upon receipt of a user input or request, the language education system 100 may begin to provide the user with human perceptible prompts associated with objects, persons, and/or activities occurring in the environment about the user. In other embodiments, the language education system 100 may begin to, selectively and autonomously, provide the user with prompts associated with objects, persons, and/or activities occurring in the environment about the user. Whether manually or autonomously initiated, each prompt includes information intended to improve the proficiency of the user in the second language using information and/or data collected and/or identified by the language education system 100.

User detection/ID circuitry 112 includes any number and/or combination of electrical components, semiconductor devices, and/or logic elements capable of executing one or more machine-readable instruction sets, programming, or logic useful for detection and/or identification the system user and/or other persons located in the environment about the system user. In embodiments, the user detection/ID circuitry 112 receives one or more signals that include information and/or data indicative of the presence the system user and/or one or more persons in the environment about the system user. In addition, the user detection/ID circuitry 112 may detect the presence of one or more persons in the environment about the language education system 100, based on information and/or data received from the sensor circuitry 130. "Presence," as used herein, may refer to, for example, persons within a room or similarly proximate the system user and/or all or a portion of the language education system 100.

Detection and/or identification of persons in the environment about the language education system 100 may be performed using one or more machine learning systems, such as neural networks including convolutional neural networks (CNNs), recurrent neural networks (RNNs), etc. that are accessed by or coupled to the user detection/ID circuitry 112. In some embodiments, the user detection/ID circuitry 112 may also attempt to uniquely identify at least some of the persons in the environment about the user, for example using facial recognition, gait recognition, or similar physiometric and/or biometric data (e.g., age, sex, height, weight, or similar). Such persons may include but are not limited to, family members, friends, and/or acquaintances of the system user. Such persons may include politicians, public figures, and/or celebrities. In some embodiments, user detection/ID circuitry 112 may detect the presence of and/or identify a system user based on voice recognition using audio information from the sensor circuitry 130. In some embodiments, presence may be detected based on a user input (e.g., via a keyboard, touch screen). The language education system 100 may detect the presence of a system user and/or other persons in the environment about the system including but not limited to: pressure sensors, motion sensors, temperature sensors, thermal imaging sensors, etc., as will be understood by those skilled in the art.

User detection/ID circuitry 112 may determine the identity of the system user via input received from the sensor circuitry 130 and/or one or more system input devices such as a keyboard, fingerprint sensor, facial recognition sensor, speech recognition, or similar. The language education system 100 may incorporate one or more local and/or cloud-based machine learning systems to detect and/or identify not only the persons present in the environment about the system 100, but also the activities (running, walking, playing a game, engaged in a conversation, etc.) in which the detected persons may be engaged.

Based on the identity of the system user, the language education system 100 retrieves or otherwise accesses information and/or data associated with the user identity. Such information may include but is not limited to: user facial data; user voice data; a first (i.e., native) language of the user; a secondary (i.e., new) language that the user is learning or wishes to increase in proficiency; user skills; policy settings associated with the user (e.g., language restrictions for users under 18 years of age); and similar. Such language may be stored, disposed, or otherwise retained in one or more non-volatile memory circuitry and/or a communicatively coupled storage device 140. The user detection/ID circuitry 112 may periodically monitor or otherwise analyze information and/or data received from the sensor circuitry 130 (detect system user presence once every second, more than once every second, once every minute, etc.). The user detection/ID circuitry 112 may detect the system user speaking using facial recognition, mouth tracking, speech recognition, or combinations thereof.

The context determination circuitry 114 includes any number and/or combination of electrical components, semiconductor devices, and/or logic elements capable of executing one or more machine-readable instruction sets or logic useful for detection and identification of contextual items such as persons, objects, activities, and similar event occurrences in the environment about the system user and/or the language education system 100. Context determination circuitry 114 may determine, based on a defined general policy, a defined policy associated with the system user, a defined policy associated with the environment about the user, and/or a defined policy associated with one or more persons proximate the system user whether to initiate or perform one or more language education operations. Context determination circuitry 114 may determine, based on a policy, the level to which such language education operations be performed. For example, if a user is engaged in a conversation with one or more people, engaging in language education operations presents an unwelcome distraction and thus a policy may cause the context determination context 114 to terminate or abort the initiation of language education operations. In other examples, context determination circuitry 114 may detect that a user is in communication with one or more people speaking words of a language the user is attempting to learn, and thus policies may result in context determination circuitry 114 to proceed with language education operations, translation operations, etc.

Context determination circuitry 114 may receive and utilize information received from one or more sensors 130. In some embodiments, context determination circuitry 114 may receive information from the user detection/ID circuitry 112. For example, the context determination circuitry 114 may receive information and/or data detecting one or more persons present in the environment about the language education system 100, as well as the relative location of each of the one or more persons to the environment, objects in the environment, and/or the other persons present in the environment. Using such information and/or data provided by the user detection/ID circuitry 112 and/or sensor circuitry 130, the context determination circuitry 114 may determine which persons, if any, are engaged in conversation and/or which persons (if any) are interacting with objects present in the environment. In embodiments, the context determination circuitry 114 may determine one or more personal contextual parameters associated with a person engaged in a conversation in the second language with the system user. Such personal contextual parameters may include but are not limited to: age, gender, and/or social status of the person with whom the system user is conversing. Thus, the language education system 100 may beneficially provide words, phrases, grammar, and sentence structure that reflects the personal contextual parameters of the person with whom the system, user is conversing.

Object detection/ID circuitry 116 includes any number and/or combination of electrical components, semiconductor devices, and/or logic elements capable of executing one or more machine-readable instruction sets or logic useful for detection and identification of one or more objects in an environment as subjects suitable for engaging in language education operations with one or more users. "Objects," as used herein, may refer to animate or inanimate items, actions, etc. For example, in one embodiment the object detection/ID circuitry 116 may detect and/or identify objects such as chairs, tables, appliances, etc. that are present within the environment about the one or more users. In some embodiments, object detection/ID circuitry 116 may detect and/or identify an action being performed by a user (e.g., running, stretching, eating, etc.). In embodiments, the object detection/ID circuitry 116 receives information and/or data from the sensor circuitry 130 and/or from one or more external or remote devices via the I/O circuitry 112. Using the received information, the object detection/ID circuitry 116 may identify an object based on, for example, shape and/or image recognition using machine learning systems (e.g., CNNs, RNNs, etc.). In embodiments, the object detection/ID circuitry 116 may access information and/or data associated with one or more objects that is stored or otherwise retained in one or more data stores, data structures, data structures, or databases. In embodiments, all or a portion of such data stores, data structures, or databases may be stored or otherwise retained in, on, or about the storage device 140. In embodiments, all or a portion of such data stores, data structures, or databases may be stored or otherwise retained in, on, or about one or more cloud-based servers or similar data storage devices.

Object detection/ID circuitry 116 may select an object from a plurality of objects based on a respective weight value assigned to or associated with each of the plurality of objects. Such weight values may be assigned to identified objects based on a user's prior interaction with the object. For example, an object with which the user frequently interacts may receive a relatively higher weight than the weight associated with a second object with which the user interacts only occasionally. In other embodiments, weight values may be assigned based on a level of danger or threat that the object presents to the user. For example, the object detection/ID circuitry 116 may assign a relatively greater weight to an object presenting an imminent hazard, such as a sign warning of a potential dangerous condition (e.g., "Falling Ice," "Hot Surface") that the weight assigned to a relatively benign object such as a coffee cup that presents little or no threat to the user. Object detection/ID circuitry 116 may select an object based on a user's behavior and/or level of engagement or interaction with the object. For example, based on facial recognition operations performed on images received from a camera, the object detection/ID circuitry 116 may detect and identify an object with which a user is interacting. If the user is looking at the subject, object detection/ID circuitry 116 may assign a higher weight value to the subject.

In some embodiments, the object detection/ID circuitry 116 may detect one or more surfaces in the environment that are suitable for use by the language education system. For example the object detection/ID circuitry 116 may detect and identify one or more "surfaces suitable for projection" such as walls, ceilings, countertops, or similar flat surfaces; non-reflective surfaces; and/or light-colored surfaces (whereas darker surfaces may be less suitable for projection), as will be understood by those skilled in the art. Additionally, higher levels of ambient light negatively impact visibility of projection. The object detection/ID circuitry 116 may obtain information from sensors, such as image acquisition devices (e.g., visible spectrum and/or infrared spectrum cameras) and/or sensor circuitry 130 to detect surfaces suitable for projection in the environment.

Linguistic analysis circuitry 118 includes any number and/or combination of electrical components, semiconductor devices, and/or logic elements capable of executing one or more machine-readable instruction sets or logic useful for analysis and/or identification of an audio input and/or generation of an audio output based upon one or more user criteria. For example, the linguistic analysis circuitry 118 may receive an input (e.g., an audio input) associated with an object in a first language (e.g., English) and generate an output (e.g., an audio output) that identifies the object in a second language (e.g., Spanish) that is different from the first language. Linguistic analysis circuitry 118 may access one or more linguistic data stores, data tables, data structures, and/or databases that include information and/or data containing a respective word or phrase in each of a plurality of languages that is associated with a particular object. Such linguistic data tables, data structures, and/or databases may be stored, disposed or otherwise retained in, on, or about the storage device 140. In embodiments, the linguistic analysis circuitry 118 may access or perform a similar look-up operation using one or more user identification data tables, data store, data structures, or databases that includes information and/or data that associates a particular user with one or more languages. For example, a user identification data table, data store, data structure, or database that includes information indicative of a user's native (i.e., first) language and a user's desired (i.e., second) language. Using such information, the linguistic analysis circuitry 108 may determine a word for the subject in the second language.

In some embodiments, linguistic analysis circuitry 118 may determine a phrase in a second language the user is attempting to learn and/or the native or first language the user speaks, accounting for grammar of various possible uses of the subject in a phrase (e.g., different verb tenses, subject/verb structural differences, singular/plural, and similar). The linguistic analysis circuitry 118 may select the phrase from a phrase data store, data structure, data table, or database associated with the second language. In embodiments, the linguistic analysis circuitry 118 may further determine a difficulty of translation of the phrase. The difficulty may be based on, for example, the length of the phrase (e.g., a longer phrase may be considered more difficult), a verb tense used in the phrase (e.g., for English, present tense may be considered less difficult, while more obscure tenses such as future perfect progressive tense may be considered more difficult), a subject of the phrase a combination of the above, or the like. The difficulty may be represented in a "rating" (such as a value from 1 to 10) and linguistic analysis circuitry 108 cause the rating to be associated with the phrase and stored in memory circuitry.

Prompt generation circuitry 120 includes any number and/or combination of electrical components, semiconductor devices, and/or logic elements capable of executing one or more machine-readable instruction sets or logic useful for generating a human-perceptible output that provides prompts and/or guidance that assist the system user in the second language. Such prompts may include one or more visual prompts. For example a visual prompt or cue displayed next to a physical object or person in an augmented reality setting (e.g., in a virtual reality headset) or a visual prompt projected on a surface near a physical object or person (e.g., on a table top or wall). Such prompts may include one or more audio prompts. For example, an audio prompt or cue generated in a second language that is in response to one or more received audio signals (e.g., an appropriate response in a second language to a greeting such as "How are you today?" spoken to the system user in the second language). In embodiments, the prompt generation circuitry 120 may selectively generate the human-perceptible output based on one or more sensed environmental factors. Thus, for example, in a noisy environment (e.g., a high ambient noise level environment) the prompt generation circuitry 120 may selectively and autonomously generate a prompt that includes visual data. In contrast, in a bright environment (e.g., outdoors on a sunny day) the prompt generation circuitry 120 may selectively and autonomously generate a prompt that includes audio data. In embodiments, the prompt generation circuitry 120 may include one or more articulated projection devices capable of projecting a beam of visible light on an object in the environment about the language education system 100. In embodiments, the prompt generation circuitry 120 may selectively project an image of an object on a surface in the environment about the language education system 100 and request the system user identify the object using the second language. In embodiments, the language education system 100 may cause the prompt generation circuitry 120 to generate an output that includes one or more words or phrases in the second language. For example, the language education system 100 may cause the prompt generation circuitry 120 to generate an second language output on a kitchen wall proximate a coffee maker that includes the second language word or phrase for "coffee."

The input/output (I/O) interface circuitry 122 includes any number and/or combination of currently available and/or future developed circuits capable of providing input from one or more devices, such as sensor circuitry 130, to the language education system 100 and/or providing output generated by the language education system 100 to one or more external devices. In embodiments, the I/O interface circuitry 122 may include one or more wired I/O interface circuits, one or more wireless I/O interface circuits, or any combination thereof. In embodiments, the I/O interface circuitry 122 may communicatively couple the language education system 100 to a processor-based device in which the language education system 100 is disposed. In embodiments, the I/O interface circuitry 122 may communicably couple the language education system 100 to one or more wearable devices carried or donned by the system user, for example glasses or a watch containing a processor-based device. The I/O interface circuitry 122 may communicate using an industry standard (e.g., Near Field Communication, Bluetooth, Universal Serial Bus) or proprietary communication protocol.

The sensor circuitry 130 may include any number and/or combination of currently available and/or future developed sensors. At least a portion of the sensor circuitry 130 may be disposed integral with the language education system 100. In embodiments, at least a portion of the sensor circuitry 130 may be disposed remote from the language education system 100 and may be communicatively coupled to the language education system 100 via one or more wired or wireless personal area networks (e.g., Near Field Communication, Bluetooth®); one or more wired or wireless local area networks (LANs); and/or one or more wired or wireless wide area networks (WANs). The sensor circuitry 130 may include but is not limited to: one or more still image acquisition devices, one or more video capture devices; one or more audio capture devices; one or more tactile input devices; one or more infrared image capture devices; one or more fingerprint capture devices; one or more biometric capture devices (pulse, respiration, electrocardiogram, skin conductivity, retinal scanner, etc.); one or more thermal sensors; one or more geolocation sensors; one or more proximity sensors; one or more accelerometers; or combinations thereof. In embodiments, the sensor circuitry 130 generates one or more output signals that are communicated to the language education system 100. In embodiments, the sensor circuitry 130 generates one or more output signals that are communicated to the language education system 100 via one or more input/output interface circuits coupled to a processor or controller. In embodiments, the sensor circuitry 130 may be powered by a processor-based device that includes the language education system 100. In embodiments, the sensor circuitry 130 may be self-powered (e.g., the sensor circuitry itself may include a power supply such as an energy storage device or solar cell). In embodiments, the sensor circuitry 130 may be externally powered, for example using an external power grid.

The storage device 140 may include any number and/or combination of currently available and/or future developed non-transitory data storage systems or devices. In embodiments, the storage device 140 may be disposed in whole or in part in the processor-based device that includes the language education system 100. In embodiments, the storage device 140 may include one or more remote, network-accessible, storage devices, such as one or more cloud-based servers. The storage devices 140 may be used to store information and/or data that includes but is not limited to one or more of the following: vocabulary in a plurality of languages including at least the first language and the second language for each user of the language education system 100; user identification (User ID/Password); user biometrics; weight factors for one or more neural networks; image libraries; neural network topography information; user language education status; and similar. The storage device 140 may include any number and/or combination of: magnetic storage devices; electromagnetic storage devices; optical storage devices; solid state storage devices; rotating magnetic storage devices (hard drives); quantum storage devices; atomic storage devices; and similar.

Figure 2:
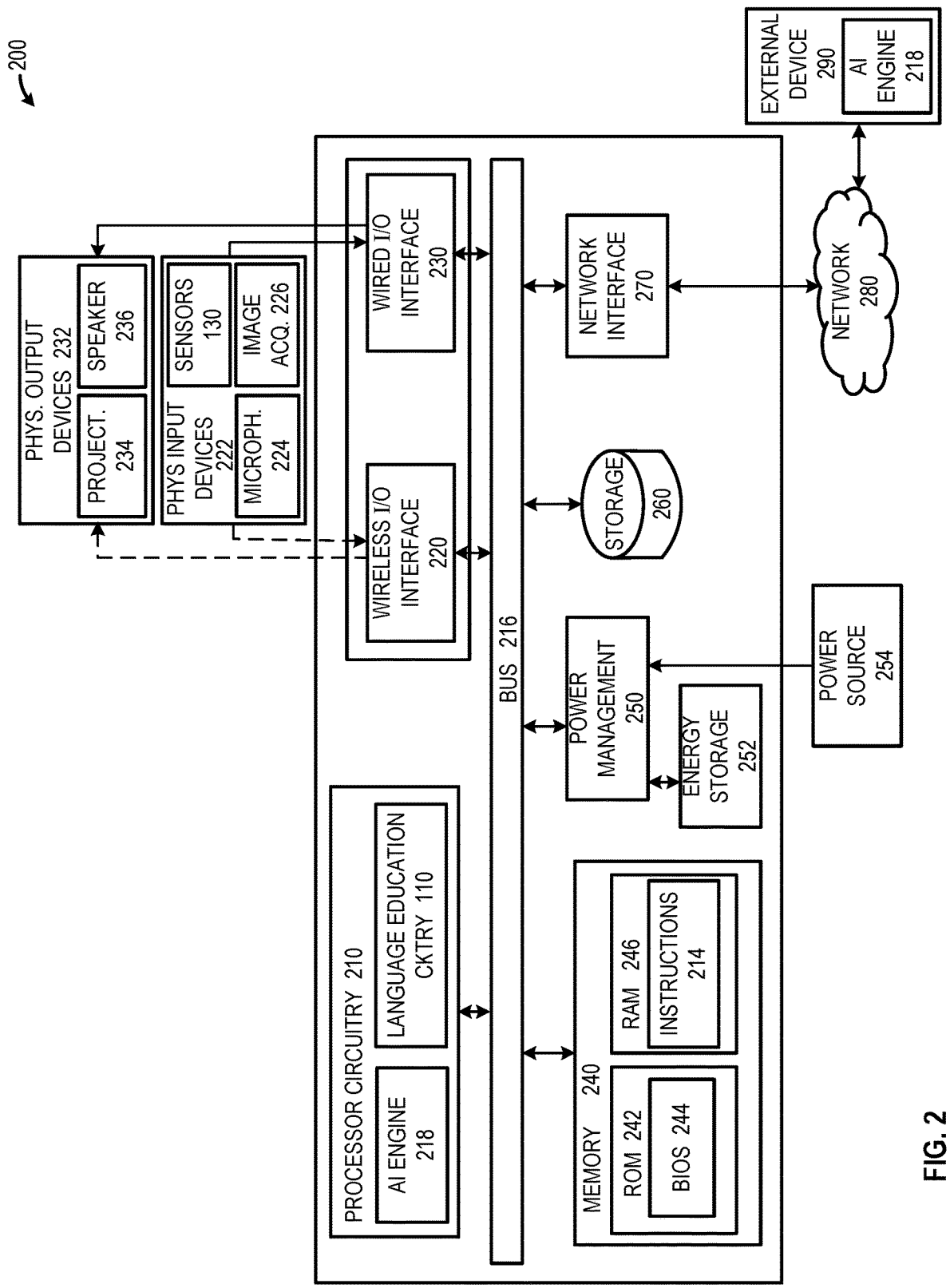
FIG. 2 is a schematic diagram of an illustrative electronic, processor-based, device that includes processor circuitry, at least a portion of which provides language education circuitry, in accordance with at least one embodiment described herein.

FIG. 2 is a schematic diagram of an illustrative electronic, processor-based, device 200 that includes processor circuitry 210, at least a portion of which provides language education circuitry 110, in accordance with at least one embodiment described herein. As depicted in FIG. 2, in embodiments, the processor circuitry 210 may additionally include AI engine circuitry 218 accessed by the language education circuitry 110. In embodiments, such AI engine circuitry 218 may assist with one or more aspects of the language education system 100, such as object detection and/or identification; facial recognition; activity detection and/or identification; speech recognition; language detection, and similar. Also as depicted in FIG. 2, in embodiments, all or a portion of the AI engine circuitry 218 may be provided as a service hosted on one or more external devices 290 (e.g., one or more cloud-based server systems) accessed via one or more networks 280. Such remotely hosted AI engine circuitry 218 beneficially reduces the computational load placed upon the processor circuitry 210 in the processor-based device 200.

The processor-based device 200 may additionally include one or more of the following: graphical processing unit 212, a wireless input/output (110) interface 320, a wired I/O interface 330, system memory 170, power management circuitry 350, a non-transitory storage device 360, and a network interface 370. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, servers, blade server devices, workstations, and similar.

The AI engine circuitry 218 may include any combination and/or number of currently available and/or future developed artificial intelligence circuits, devices, and/or systems. In embodiments, the AI engine circuitry 218 may include one or more neural networks trained using one or more positive training sets, one or more negative training sets, or combinations thereof. In embodiments, a first neural network circuit 2181 may be used to detect and/or identify objects in an environment about the processor-based device 200. In embodiments, a second neural network circuit 2182 that is the same as or different from the first neural network circuit may be used to detect and/or identify persons in the environment about the processor-based device 200. In embodiments, a third neural network circuit 2183 that is the same as or different from the first neural network circuit and/or the second neural network circuit may be used to detect and/or identify activities occurring in the environment about the processor-based device 200. In embodiments, a fourth neural network circuit 2184 that is the same as or different from the first neural network circuit, second neural network circuit, and/or third neural network circuit may be used to perform language detection and/or identification. Such neural networks may include but are not limited to: a feed forward neural network (FF), a radial basis neural network (RBF), a deep feed forward neural network (DFF), a recurrent neural network (RNN), a gated recurrent unit neural network (GRU), an auto encoder neural network (AE), a variational auto encoder neural network (VAE), a denoising auto encoder neural network (DAE), a sparse auto encoder neural network (SAE), a Markov chain neural network (MC), a Hopfield network neural network (HN), a Boltzmann machine neural network (BM), a restricted Boltzmann machine neural network (RBM), a deep belief neural network (DBN), a deep convolution neural network (DCN), a deconvolutional neural network (DN), a deep convolution inverse graphics neural network (DCIGN), a generative adversarial neural network (GAN), a liquid state machine neural network (LSM), an extreme learning machine neural network (ELM), an echo state neural network (ESN), a deep residual neural network (DRN), a Kohonen neural network (KN), a support vector machine neural network (SVM), and/or a neural Turing machine neural network (NTM).

In embodiments, the processor-based device 200 includes graphics processing unit (GPU) circuitry 212 capable of executing machine-readable instruction sets that perform tensor operations. In embodiments the GPU circuitry 212 generates one or more output signals capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 210 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 200 includes a bus or similar communications link 216 that communicably couples and facilitates the exchange of information and/or data between various system components including the processor circuitry 210, the GPU circuitry 212, one or more wireless I/O interfaces 220, one or more wired I/O interfaces 230, the system memory 240, one or more storage devices 260, and/or one or more network interfaces 270. The processor-based device 200 may be referred to in the singular herein, but this is not intended to limit the embodiments to a single processor-based device 200, since in certain embodiments, there may be more than one processor-based device 200 that incorporates, includes, or contains any number of communicably coupled, collocated, or remote networked circuits or devices.

The processor circuitry 210 may include any number, type, or combination of currently available or future developed devices capable of executing at least machine-readable instruction sets associated with the language education system 100. The processor circuitry 210 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 2 are of conventional design. Consequently, such blocks need not be described in further detail herein, as they will be understood by those skilled in the relevant art. The bus 216 that interconnects at least some of the components of the processor-based device 200 may employ any currently available or future developed serial or parallel bus structures or architectures.

In embodiments, the processor circuitry 210 is disposed in a semiconductor package containing multiple circuits. The semiconductor package may have any size, shape, or geometry—for example, the semiconductor package may include a multi-chip module (MCM) containing a plurality of interconnected, individual, semiconductor packages. The semiconductor package may additionally include one or more semiconductor packages that provide either or both the language education circuitry 110 and/or the AI engine circuitry 218.

The system memory 240 may include read-only memory ("ROM") 242 and random access memory ("RAM") 246. A portion of the ROM 242 may be used to store or otherwise retain a basic input/output system ("BIOS") 244. The BIOS 244 provides basic functionality to the processor-based device 200, for example by causing the processor circuitry 210 to load and/or execute one or more machine-readable instruction sets 214. In embodiments, at least some of the one or more machine-readable instruction sets cause at least a portion of the processor circuitry 210 to provide, create, produce, transition, and/or function as a dedicated, specific, and particular machine, for example by providing an interactive and intuitive language education system 100 that incorporates augmented reality features while using AI engine circuitry 218 to detect and/or identify objects, persons, and/or activities in the environment about the processor-based device 200.

The processor-based device 200 includes I/O interface circuitry 122 that includes wireless I/O interface circuitry 220 and/or wired I/O interface circuitry 230. The wireless I/O interface circuitry 220 may communicatively couple to one or more physical input devices 222 (pointing devices, touchscreens, keyboards, tactile devices, etc.). The wireless I/O interface circuitry 220 may communicatively couple to one or more physical output devices 232 (tactile devices, video displays, audio output devices, hardcopy output devices, etc.). The wireless I/O interface circuitry 220 may include circuitry capable of facilitating communication between I/O devices and the processor circuitry 210 using any currently available or future developed wireless I/O interface communication protocol. Example wireless communication protocols include but are not limited to: BLUETOOTH®, near field communication (NFC), and similar.

The wired I/O interface circuitry 230 may communicatively couple to one or more physical input devices 222 (pointing devices, touchscreens, keyboards, tactile devices, etc.). The wired I/O interface circuitry 230 may communicatively couple to one or more physical output devices 232 (tactile devices, video displays, audio output devices, hardcopy output devices, etc.). The wired I/O interface 230 may include circuitry capable of facilitating communication between I/O devices and the processor circuitry 210 using any currently available or future developed I/O interface communication protocol. Example communication protocols include but are not limited to: universal serial bus (USB), IEEE 1394 ("FireWire"), and similar.

The processor-based device 200 includes one or more wired and/or wireless I/O devices capable of providing the language education system 100. Example input devices 222 capable of providing information and/or data to the language education system 100 include but are not limited to: one or more sensors 130 (e.g., environmental sensors such as temperature, humidity, proximity, motion sensors, and similar; or system status sensors such as accelerometers, directional indicators, geolocation sensors, and similar); one or more microphones 224; and/or one or more image acquisition devices 226, such as one or more still or video cameras. Example output devices third on-chip processor memory circuitry portion 232 include but are not limited to: one or more projection systems or devices 234 and/or one or more speakers 236. In embodiments, the output devices third on-chip processor memory circuitry portion 232 may include one or more virtual reality (VR) headsets capable of providing an immersive augmented reality environment in which the language education circuitry 110 provides one or more audio and/or visual prompts. In embodiments, some or all of the input devices 222 and/or some or all of the output devices 232 may be disposed integral with the processor-based device 200. For example, a smartphone or similar portable or wearable processor-based device 200 may include one or more displays to present visual information, one or more cameras to collect image information, one or more environmental sensors to collect ambient environment information, one or more microphones to collect audio information, one or more speakers to present audio information, and/or one or more projection devices to present visual information within the ambient environment surrounding the processor-based device 200. In other embodiments, the language education circuitry 110 may cause the processor-based device 200 to communicate language education information and/or data to one or more external devices—for example, audio output data may be communicated via BLUETOOTH to an external speaker or visual output data may be communicated via USB to an external projection device.

The processor-based device 200 may include one or more communicably coupled, non-transitory, data storage devices 140. The data storage device 140 may include one or more hard disk drives (HDDs) and/or one or more solid-state storage devices (SSDs). The one or more data storage devices 140 may include any current or future developed storage appliances, network storage devices, and/or systems. Non-limiting examples of such data storage devices 140 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 140 may include one or more removable storage devices, such as one or more flash drives, flash memories, flash storage units, or similar appliances or devices capable of communicable coupling to and decoupling from the processor-based device 200.

The one or more data storage devices 140 may include interfaces or controllers (not shown) communicatively coupling the respective storage device or system to the bus 216. The one or more data storage devices 360 may store, retain, or otherwise contain machine-readable instruction sets, data structures, program modules, data stores, databases, logical structures, and/or other data useful to the processor circuitry 210 and/or GPU circuitry 212 and/or one or more applications executed on or by the processor circuitry 210 and/or GPU circuitry 212. In some instances, one or more data storage devices 140 may be communicably coupled to the processor circuitry 210, for example via the bus 216 or via the wired I/O interface circuitry 230 (e.g., Universal Serial Bus or USB); via the wireless communications interface circuitry 220 (e.g., Bluetooth®, Near Field Communication or NFC); and/or network interface circuitry 270 (IEEE 802.3 or Ethernet, IEEE 802.11, or WiFi®, etc.).

The processor-based device 200 may include power management circuitry 250 that controls one or more operational aspects of the energy storage device 252. In embodiments, the energy storage device 252 may include one or more primary (i.e., non-rechargeable) or secondary (i.e., rechargeable) batteries or similar energy storage devices. In embodiments, the energy storage device 252 may include one or more supercapacitors or ultracapacitors. In embodiments, the power management circuitry 250 may alter, adjust, or control the flow of energy from an external power source 254 to the energy storage device 252 and/or to the processor-based device 200. The power source 254 may include, but is not limited to, a solar power system, a commercial electric grid, a portable generator, an external energy storage device, or any combination thereof.

For convenience, the processor circuitry 210, the GPU circuitry 212, the storage device 140, the system memory 240, the wireless I/O interface circuitry 220, the wired I/O interface circuitry 230, the power management circuitry 250, and the network interface circuitry 270 are illustrated as communicatively coupled to each other via the bus 216, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via one or more intermediary components (not shown). In some embodiments, all or a portion of the bus 216 may be omitted and the components are coupled directly to each other using suitable wired or wireless connections.

Figure 3:
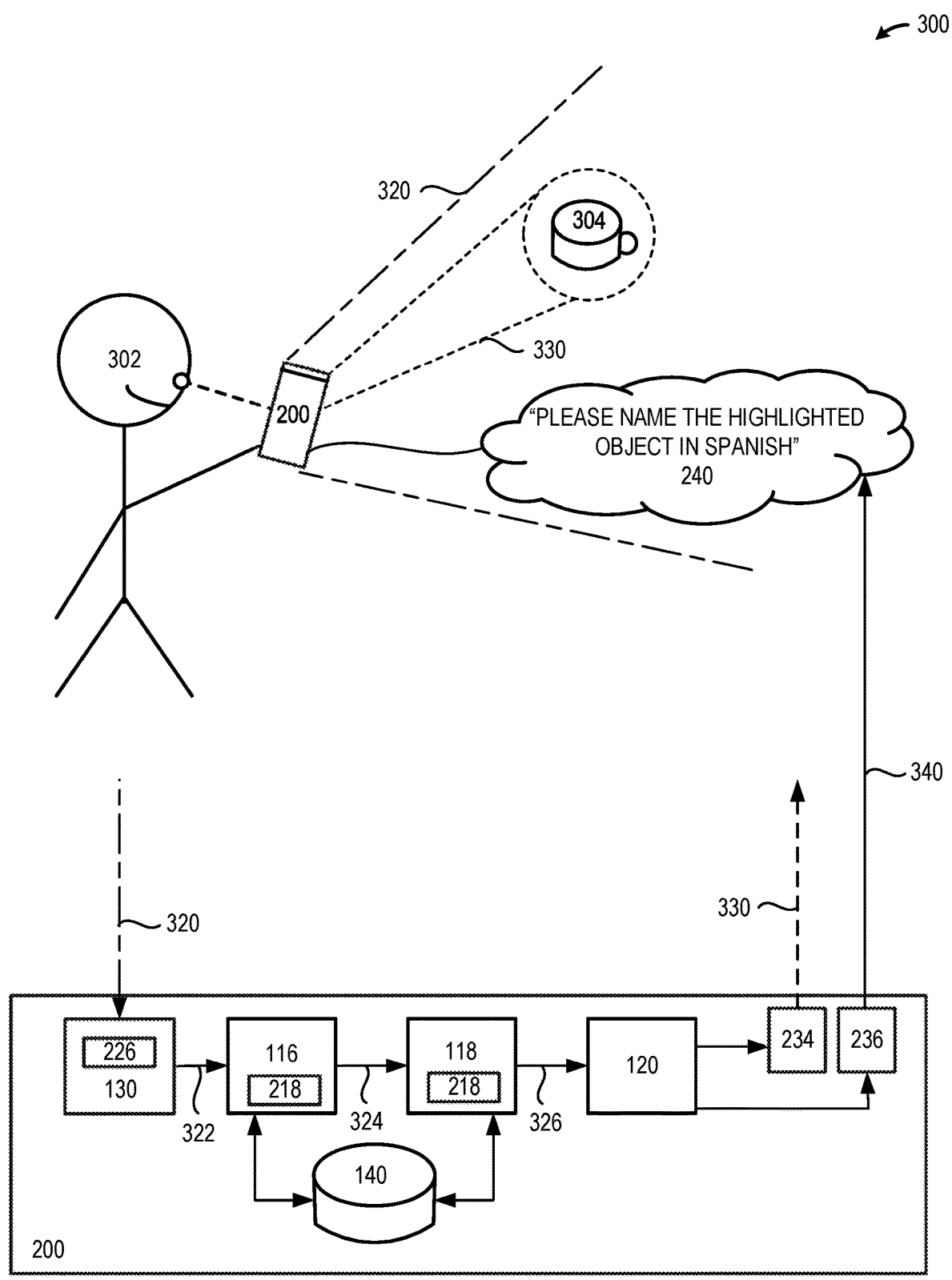
FIG. 3 depicts an illustrative usage scenario in which a processor-based device that includes a language education system highlights an object in the environment about a system user, identifies the object and, in response, generates an audio prompt, in accordance with at least one embodiment described herein.

FIG. 3 depicts an illustrative usage scenario 300 in which a processor-based device 200 that includes a language education system 100 highlights an object 304 in the environment 310 about a system user 302, identifies the object 304 and, in response, generates an audio prompt 340, in accordance with at least one embodiment described herein. As depicted in FIG. 3, one or more sensors 130, such as one or more image acquisition devices 226, detect 320 at least some of a plurality of objects present in the environment 310 and generates an output signal 322 that includes information and/or data associated with the detected objects. The output signal 322 includes information and/or data associated with the one or more detected objects, such as a cup 304, present in the environment 310 about the system user 302. The object detection/ID circuitry 116 receives the output signal 322. In at least some embodiments, the object detection/ID circuitry 116 may include AI circuitry 218 that performs object detection and identification on at least some of a plurality of objects included in the environment 310. In embodiments, the object detection/ID circuitry 116 and/or the AI circuitry 218 may access one or more data structures, data stores, data tables, and/or databases that include information and/or data useful for identifying objects, such as cup 304, in the environment 310.

After the object detection/ID circuitry 116 identifies the object 304, the object detection/ID circuitry 116 generates an output signal 324 that includes information indicative of the identified object to the linguistic analysis circuitry 118. In at least some embodiments, the linguistic analysis circuitry 118 may include AI circuitry 218 that determines the appropriate word or phrase associated with the object 304 in the first language of the system user 302 and/or the second language of the system user 302. In embodiments, the linguistic analysis circuitry 118 and/or the AI circuitry 218 may access one or more data structures, data stores, data tables, and/or databases that include information and/or data useful for identifying the word or phrase associated with the identified object 304 in the first language of the system user 302 and/or the second language of the system user 302.

After the linguistic analysis circuitry 118 determines the appropriate word or phrase associated with the object 304 in the first language of the system user 302 and/or the second language of the system user 302, the linguistic analysis circuitry 118 generates an output signal 326 that includes information and/or data representative of the word or phrase associated with the object 304. The prompt generation circuitry 120 receives the output signal 326 receives the output signal 326 and, using the information and/or data included in the output signal 326, generates a visual output 330 that identifies the object 304. For example, the processor-based device 200 may generate a visual output 330 using a projector 234 to illuminate or otherwise designate the identified object 304 in the environment 310. In embodiments, the processor-based device may cause an audio output device 236, such as a speaker, to generate an audio output 340. In embodiments, the audio output 340 may request the system user 302 name the identified object 304 in the second language.

Although not depicted in FIG. 3 for clarity, once the system user 302 names the identified object 304 in the second language, the language education system 100 may assess whether the system user 302 used the correct word or phrase and/or whether the system user 302 used appropriate pronunciation, inflection, and/or tonal quality in naming the identified object. The language education system 100 may then provide constructive feedback to the system user 302.

Figure 4:
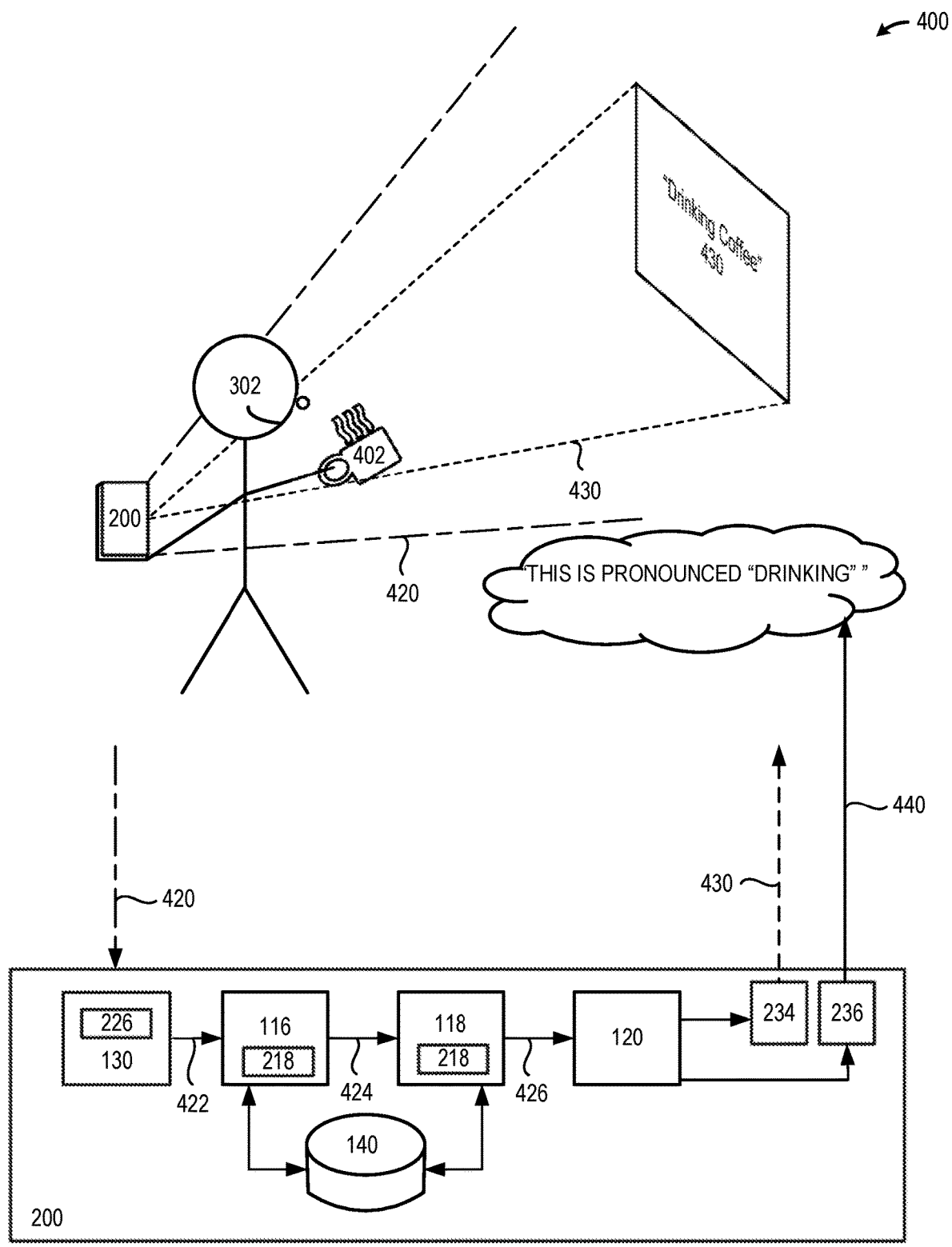
FIG. 4 depicts another illustrative usage scenario in which a processor-based device that includes a language education system detects an action, identifies the action and, in response, generates a visual prompt and an audio prompt for the system user, in accordance with at least one embodiment described herein.

FIG. 4 depicts another illustrative usage scenario 400 in which a processor-based device 200 that includes a language education system 100 detects an action 402, identifies the action 402 and, in response, generates a visual prompt 430 and an audio prompt 440 for the system user 302, in accordance with at least one embodiment described herein. As depicted in FIG. 4, one or more sensors 130, such as one or more image acquisition devices 226, detects 420 the performance of one or more actions 402 performed in the environment 310. The image acquisition device 130 generates an output signal 422 that includes information and/or data representative of the detected action 402.

The output signal 422 includes information and/or data associated with the one or more detected actions or activities 402, such as a movement or motion indicative of a drinking motion performed by the system user 302. The object detection/ID circuitry 116 receives the output signal 422. In at least some embodiments, the context determination circuitry 114 may provide additional information and/or data representative of the environmental context in which the action or activity 402 is performed. Such environmental context information may beneficially permit the object detection/ID circuitry 116 to distinguish between similar actions such as drinking (context: restaurant or kitchen) and weightlifting (context: gymnasium). In embodiments, the context determination circuitry 114 and/or the object detection/ID circuitry 116 may include AI circuitry 218 that performs action and/or activity detection and identification. In embodiments, the context determination circuitry 114 and/or the object detection/ID circuitry 116 and/or the AI circuitry 218 may access one or more data structures, data stores, data tables, and/or databases that include information and/or data useful for identifying objects, such as cup 304, in the environment 310.

After the object detection/ID circuitry 116 identifies the action or activity 402, the object detection/ID circuitry 116 generates an output signal 424 that includes information representative of the identified action or activity to the linguistic analysis circuitry 118. In at least some embodiments, the linguistic analysis circuitry 118 may include AI circuitry 218 that determines the appropriate word or phrase associated with the action or activity 402 in the first language of the system user 302 and/or the second language of the system user 302. In embodiments, the linguistic analysis circuitry 118 and/or the AI circuitry 218 may access one or more data structures, data stores, data tables, and/or databases that include information and/or data useful for identifying the word or phrase associated with the identified action or activity 402 in the first language of the system user 302 and/or the second language of the system user 302.

After the linguistic analysis circuitry 118 determines the appropriate word or phrase associated with the identified action or activity 402 in the first language of the system user 302 and/or the second language of the system user 302, the linguistic analysis circuitry 118 generates an output signal 426 that includes information and/or data indicative of the word or phrase and communicates the output signal 426 to the prompt generation circuitry 120. The prompt generation circuitry 120 generates a visual output 430 associated with the identified action or activity 402. In at least some embodiments, a projector 234 may generate a visual output such as a projection of the word or phrase associated with the identified action or activity 402 on a surface, such as a wall or tabletop. In some embodiments, the language education system 100 may project the word or phrase associated with the identified action or activity 402 on a surface proximate identified action or activity 402. In embodiments, the processor-based device 200 may cause an audio output device 236, such as a speaker, to generate an audio output 440. In embodiments, the audio output 440 may provide the system user 302 with the word or phrase associated with the identified action or activity 402.

Figure 5A:
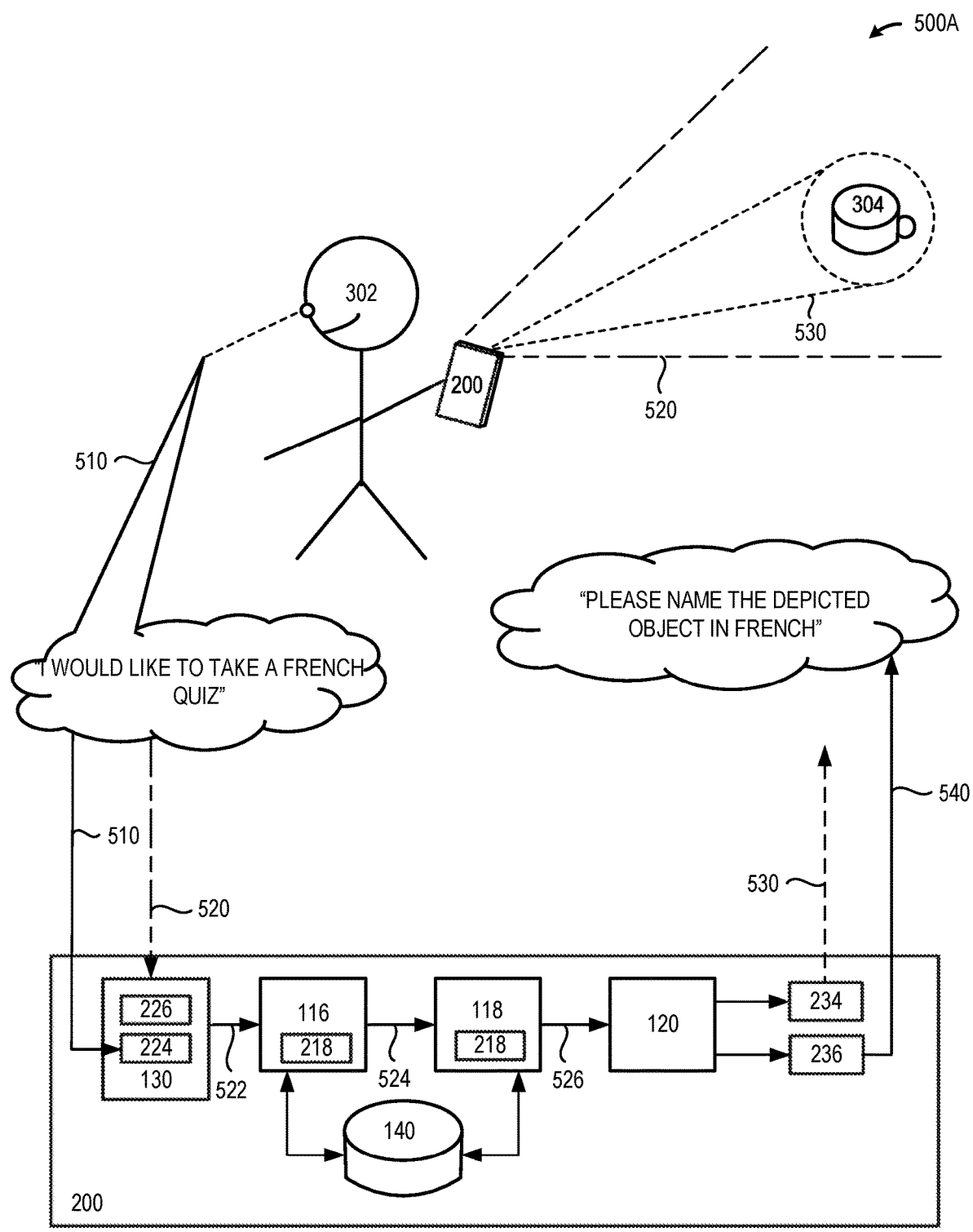
FIG. 5A depicts another illustrative usage scenario in which a processor-based device that includes a language education system detects an audible request by the system user, identifies the request and, responsive to the request, generates a visual prompt and an audio prompt, in accordance with at least one embodiment described herein.

FIG. 5A depicts another illustrative usage scenario 500 in which a processor-based device 200 that includes a language education system 100 detects an audible request 510 by the system user 302, identifies the request and, responsive to the request, generates a visual prompt 530 and an audio prompt 540, in accordance with at least one embodiment described herein. As depicted in FIG. 5A, one or more sensors 130, such as one or more microphones 224 detects the audible request 510 by the system user 302. Responsive to receipt of the request, the language education system 100 obtains information and/or data 520 associated with the environment 310 about the system user 302. For example, the language education system 100 may obtain image data of the environment 310 in which the object detection/ID circuitry 116 detects and identifies one or more objects 304. The language education system 100 then selects an object 304 in the environment 310 and generates one or more video outputs 530 highlighting the selected object 304 and/or one or more audio outputs 540 that request the user identify the selected object 304 using the second language of the user 302.

The sensors 130 generate an output signal 522 that includes information and/or data associated with the environment about the user 302 and/or the processor-based device 200. The environmental information and/or data includes information and/or data associated with one or more objects 304 disposed in the environment 310. The object detection/ID circuitry 116 receives the output signal 522. Although not depicted in FIG. 5A, in some embodiments, the context determination circuitry 114 may provide additional information and/or data representative of the environmental context in which the one or more objects 304 are disposed. Such environmental context information may beneficially permit the object detection/ID circuitry 116 to distinguish between similar objects based on the environmental context in which the objects are located. In embodiments, the context determination circuitry 114 and/or the object detection/ID circuitry 116 may include local or remote AI circuitry 218 that performs action and/or activity detection and identification. In embodiments, the context determination circuitry 114 and/or the object detection/ID circuitry 116 and/or the AI circuitry 218 may access one or more data structures, data stores, data tables, and/or databases that include information and/or data useful for identifying objects, such as cup 304, in the environment 310.

After the object detection/ID circuitry 116 identifies the object 304, the object detection/ID circuitry 116 may select an object 304 and generates an output signal 324 that includes information indicative of the selected object 304 to the linguistic analysis circuitry 118. In at least some embodiments, the linguistic analysis circuitry 118 may include local or remote AI circuitry 218 that determines the appropriate word or phrase associated with the selected object 304 in the first language of the system user 302 and/or the second language of the system user 302. In embodiments, the linguistic analysis circuitry 118 and/or the AI circuitry 218 may access one or more data structures, data stores, data tables, and/or databases that include information and/or data useful for identifying the word or phrase associated with the selected object 304 in the first language of the system user 302 and/or the second language of the system user 302.

After the linguistic analysis circuitry 118 determines the appropriate word or phrase associated with the selected object 304 in the first language of the system user 302 and/or the second language of the system user 302, the linguistic analysis circuitry 118 communicates an output signal 526 that includes information and/or data indicative of the word or phrase to the prompt generation circuitry 120. Upon receipt of the output signal 526, the prompt generation circuitry 120 generates a visual output 530 that designates the selected object 304 in the environment 310. For example, the prompt generation circuitry 120 may project an identifier on the selected object 304. In at least some embodiments, a projector 234 may generate a visual output designating the selected object 304. In some embodiments, the prompt generation circuitry 120 may generate an audio output 540 using the audio output device 236, such as a speaker. The audio output 540 may request the system user 302 speak the word or phrase associated with the selected object 304 in the second language.

Figure 5B:
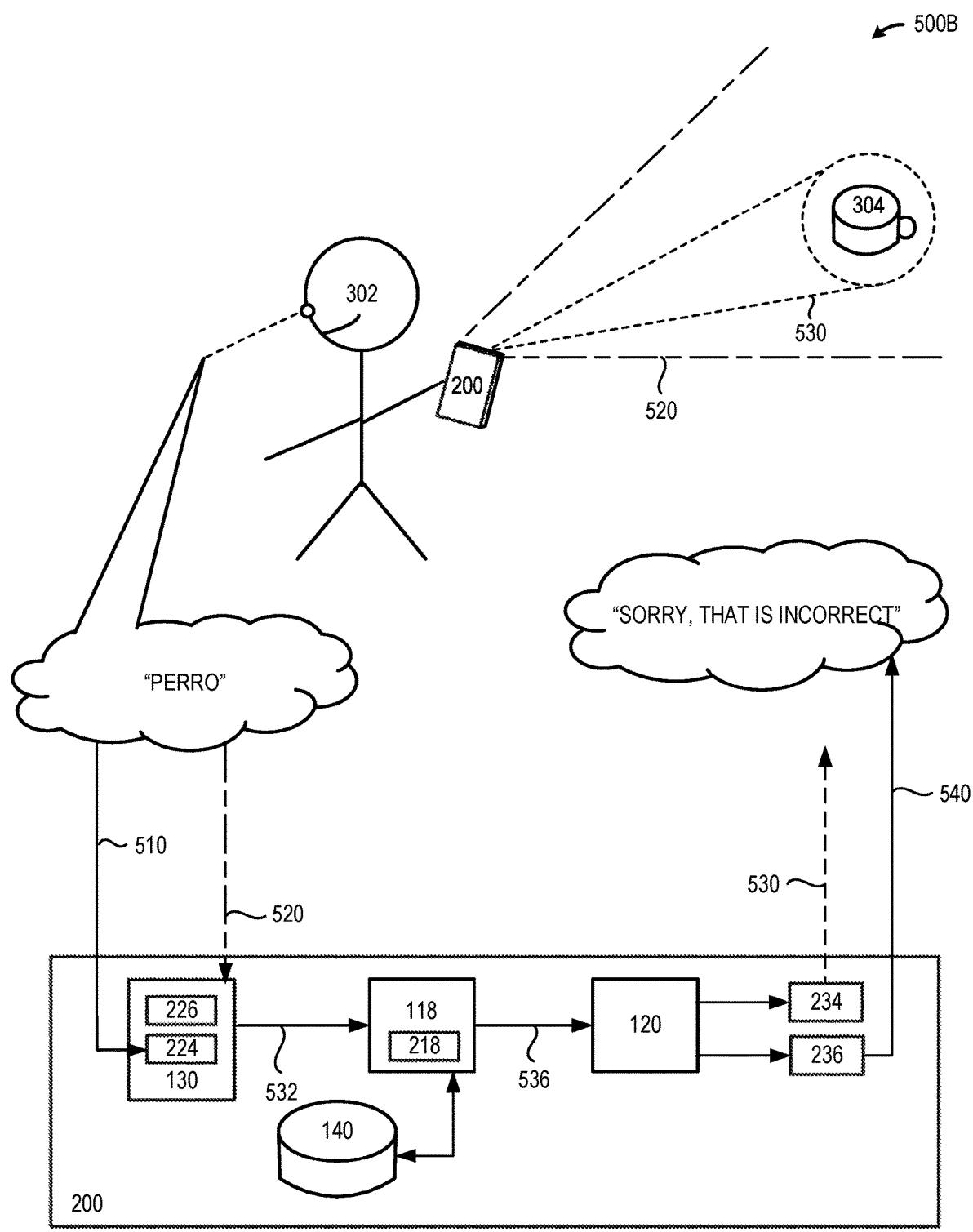
FIG. 5B depicts the illustrative usage scenario of FIG. 5A, in which a processor-based device that includes a language education system interacts with the system user in response to an incorrect answer by the system user, in accordance with at least one embodiment described herein.

FIG. 5B depicts the illustrative usage scenario 500 of FIG. 5A, in which a processor-based device 200 that includes a language education system 100 interacts with the system user 302 in response to an incorrect answer by the system user 302, in accordance with at least one embodiment described herein. As depicted in FIG. 5B, one or more sensors 130, such as one or more microphones 224 detects the audible response 510 by the system user 302 attempting to identify an object 304 in the second language. The language education system 100 receives the audible response 510 from the system user 302. In embodiments, the linguistic analysis circuitry 118 determines whether the received audible response 510 correctly identifies the selected object 304. Such identification may be performed, for example, via speech recognition performed by AI circuitry 218 disposed in or coupled to the linguistic analysis circuitry 118. In embodiments, the linguistic analysis circuitry 118 determines whether the system user 302 has used correct grammar and/or pronunciation when providing the response 510. In response to receipt of a grammatically correct oral response 510 that is correctly pronounced by the system user 302, the language education system 100 provides an audio output informing the system user 302 that he/she provided a correct response. In response to receipt of an incorrect oral response 510 from the system user 302, the language education system 100 provides an audio output informing the system user 302 that he/she provided an incorrect response. In response to receipt of a correct, but mispronounced, oral response 510 from the system user 302, the language education system 100 provides an audio output informing the system user 302 that he/she provided a correct response, however with an incorrect pronunciation. In such instances, the language education system 100 may provide an output (e.g., an audio output) that includes the correct pronunciation.

The sensors 130 generate an output signal 532 that includes information and/or data associated with the oral response 510 provided by the system user 302. The output signal 532 may also include environmental information and/or data associated with one or more objects 304 disposed in the environment 310. The linguistic analysis circuitry 118 receives the output signal 532 from the sensors 130. In embodiments, the linguistic analysis circuitry 118 may include speech recognition AI circuitry 218 trained to recognize the spoken second language that performs speech detection and identification on the oral response provided by the system user 502. In other embodiments, the linguistic analysis circuitry 118 may access remote AI circuitry 218 previously trained to recognize the spoken second language that performs speech detection and identification on the oral response provided by the system user 502. In embodiments, the linguistic analysis circuitry 118 and/or the AI circuitry 218 may access one or more data structures, data stores, data tables, and/or databases that include information and/or data useful for speech recognition in the second language of the system user 302.

The linguistic analysis circuitry 118 determines whether the oral response 510 from the system user 302 includes the correct word or phrase in the second language. The linguistic analysis circuitry 118 may further determine whether the oral response 510 includes the correct pronunciation, grammar, and/or inflection. In embodiments, the linguistic analysis circuitry 118 and/or the AI circuitry 218 may access one or more data structures, data stores, data tables, and/or databases that include information and/or data useful for identifying the word or phrase associated with the selected object 304 in the first language of the system user 302 and/or the second language of the system user 302.

After the linguistic analysis circuitry 118 determines the appropriate word or phrase associated with the selected object 304 in the second language of the system user 302, the linguistic analysis circuitry 118 communicates an output signal 536 that includes information and/or data indicative of whether the system user 302 has spoken the correct word or phrase and/or whether the word or phrase was spoken correctly. In embodiments, upon receipt of the word or phrase from the system user 302, the prompt generation circuitry 120 generates a visual output 530 that indicates whether the system user 302 has selected the correct word or phrase. In embodiments, upon receipt of the word or phrase from the system user 302, the prompt generation circuitry 120 generates a visual output 530 that indicates whether the system user 302 has used the correct pronunciation, grammar, and/or inflection.

Figure 6:
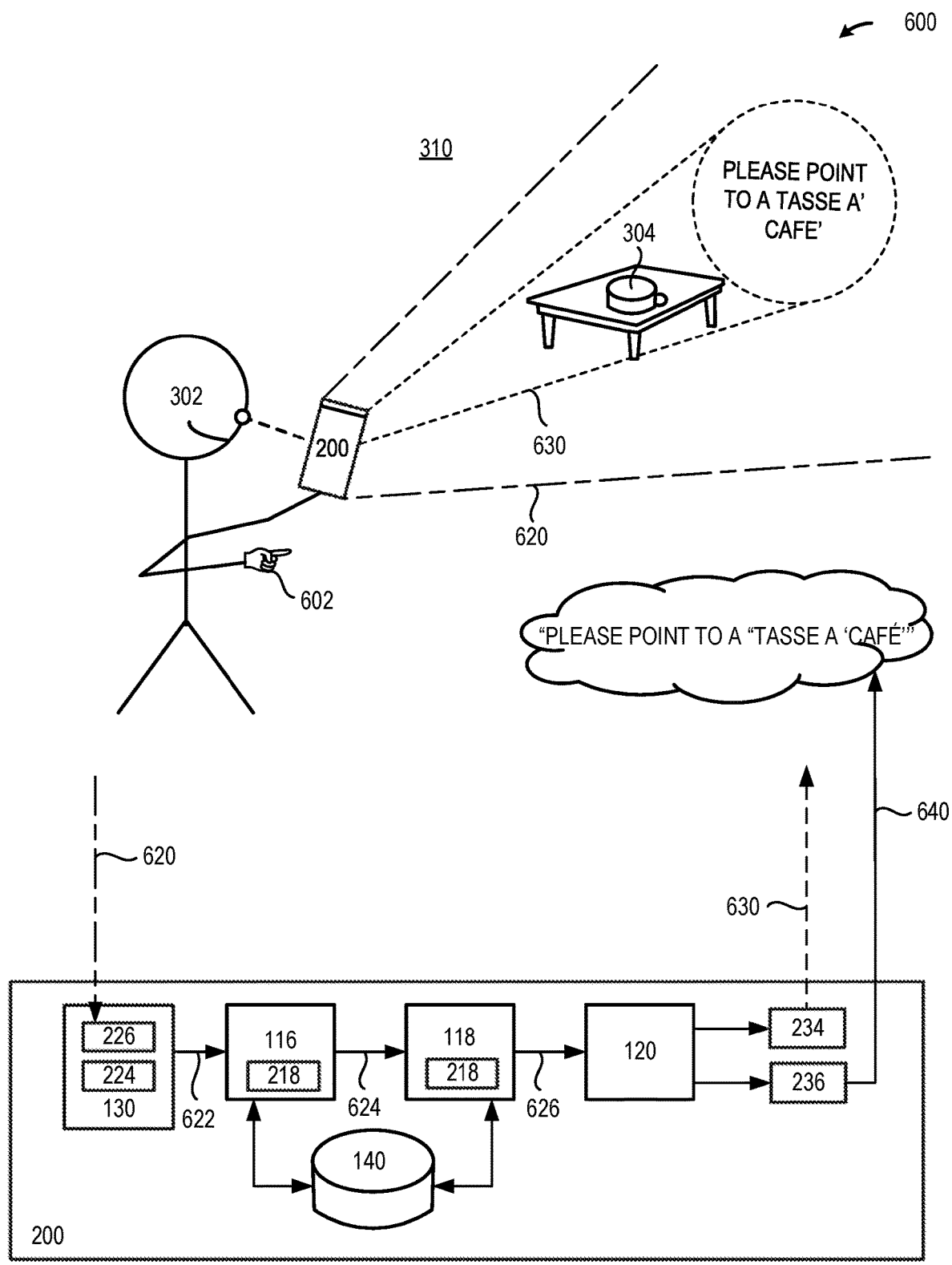
FIG. 6 depicts another illustrative usage scenario in which a processor-based device that includes a language education system that detects and identifies one or more objects in the environment about the system user, and requests the system user to perform an action, such as pointing, directed to an identified object that is detected by the language education system, in accordance with at least one embodiment described herein.

FIG. 6 depicts another illustrative usage scenario 600 in which a processor-based device 200 that includes a language education system 100 that detects and identifies one or more objects 304 in the environment 310 about the system user 302, and requests the system user 302 to perform an action, such as pointing, directed to an identified object 304 that is detected by the language education system 100, in accordance with at least one embodiment described herein. As depicted in FIG. 6, one or more sensors 130, such as one or more image capture devices 226 receives a signal 620 and generates an output signal 622 that includes information and/or data associated with one or more objects 304 in the environment 310 about the processor-based device 200. The sensor 130 communicates the output signal 622 to the object detection/ID circuitry 116. Using the information and/or data included in the output signal 622 provided by the sensors 130, the object detection/ID circuitry 116 detects and identifies one or more objects 304 present in the environment 310. The object detection/ID circuitry 116 generates an output signal 624 that includes information and/or data representative of the one or more identified objects 304 in the environment 310.

The linguistic analysis circuitry 118 determines a second language word or phrase associated with the identified object 304 and the prompt generation circuitry 120 generates one or more prompts including the second language word or phrase that requests the system user 302 perform one or more actions directed to the identified object 304. Responsive to receipt of the request, the language education system 100 obtains information and/or data 520 associated with the environment 310 about the system user 302.

The output signal generated by the sensors 130 includes information and/or data associated with the environment 310 about the user 302 and/or the processor-based device 200. The environmental information and/or data includes information and/or data associated with one or more objects 304 disposed in the environment 310. The object detection/ID circuitry 116 receives the output signal from the sensors 130. Although not depicted in FIG. 6, in some embodiments, the context determination circuitry 114 may provide additional information and/or data representative of the environmental context in which the one or more objects 304 are disposed. Such environmental context information may beneficially permit the object detection/ID circuitry 116 to distinguish between similar objects based on the environmental context in which the objects are located. In embodiments, the context determination circuitry 114 and/or the object detection/ID circuitry 116 may include AI circuitry 218 that performs action and/or activity detection and identification. In embodiments, the context determination circuitry 114 and/or the object detection/ID circuitry 116 and/or the AI circuitry 218 may access one or more data structures, data stores, data tables, and/or databases that include information and/or data useful for identifying objects, such as cup 304, in the environment 310.

After the object detection/ID circuitry 116 identifies the object 304, the object detection/ID circuitry 116 may select an object 304 and communicate information indicative of the selected object 304 to the linguistic analysis circuitry 118. In at least some embodiments, the linguistic analysis circuitry 118 may include AI circuitry 218 that determines the appropriate word or phrase associated with the selected object 304 in the first language of the system user 302 and/or the second language of the system user 302. In embodiments, the linguistic analysis circuitry 118 and/or the AI circuitry 218 may access one or more data structures, data stores, data tables, and/or databases that include information and/or data useful for identifying the word or phrase associated with the selected object 304 in the first language of the system user 302 and/or the second language of the system user 302.

After the linguistic analysis circuitry 118 determines the appropriate word or phrase associated with the selected object 304 in the second language of the system user 302, the linguistic analysis circuitry 118 communicates an output signal that includes information and/or data indicative of the word or phrase to the prompt generation circuitry 120. Upon receipt of the appropriate word or phrase, the prompt generation circuitry 120 generates a visual output 630 that includes a prompt for the system user to "point" 602 or otherwise perform a physical action and/or interaction associated with the selected object 304. In embodiments, the prompt generation circuitry 120 generates an audio output 640 that requests the system user 302 to "point" 602 or otherwise perform a physical action and/or interaction associated with the selected object 304.

Figure 7:
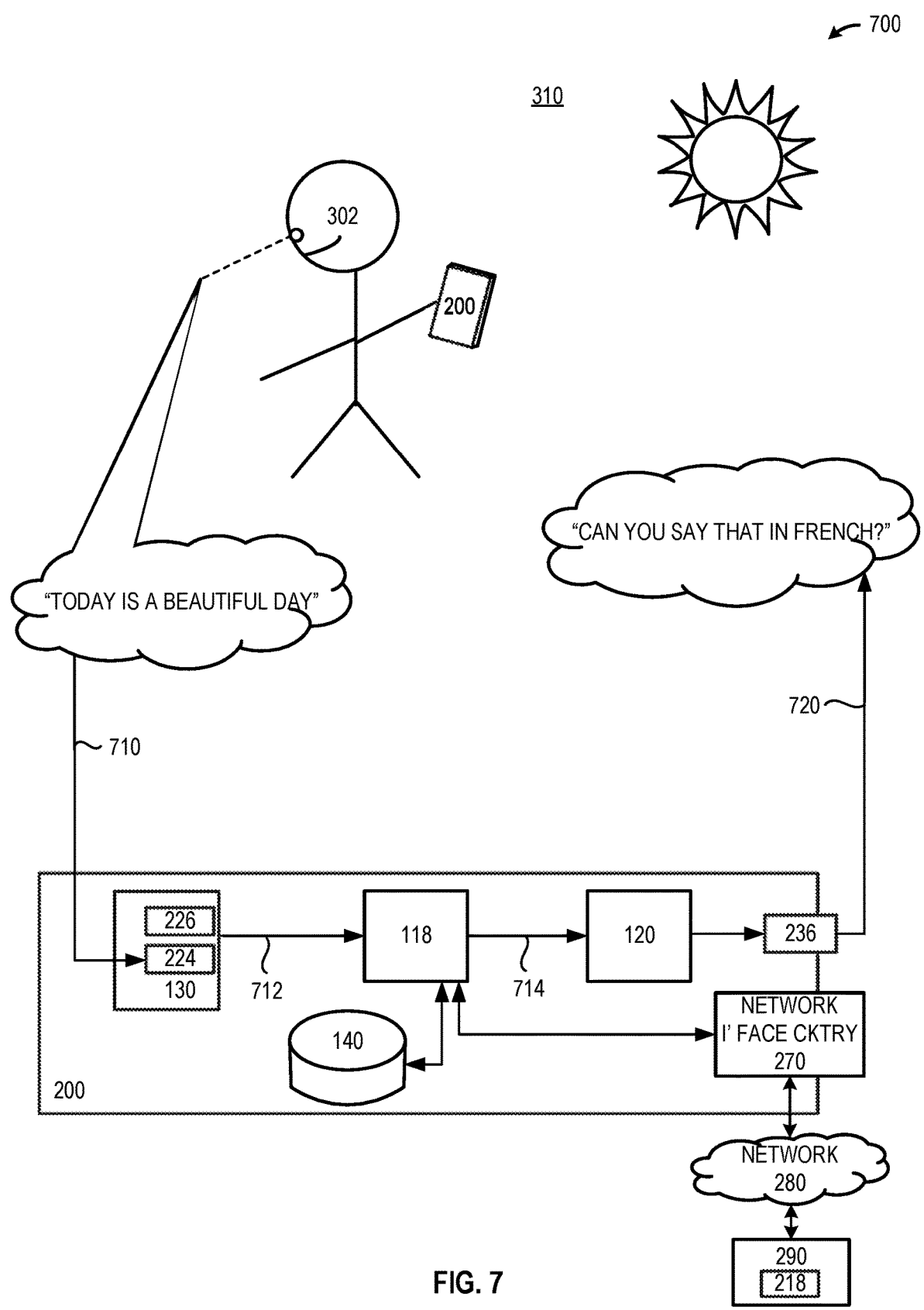
FIG. 7 depicts another illustrative usage scenario in which a processor-based device that includes a language education system that detects a word or phrase spoken in the first language by the system user and requests the system user to speak the word or phrase in the second language, in accordance with at least one embodiment described herein.

FIG. 7 depicts another illustrative usage scenario 700 in which a processor-based device 200 that includes a language education system 100 that detects a word or phrase spoken in the first language 720 by the system user 302 and requests the system user 302 to speak the word or phrase in the second language, in accordance with at least one embodiment described herein. As depicted in FIG. 7, one or more sensors 130, such as one or more microphones 224 generates a signal 710 that includes information and/or data associated with a word or phrase spoken by the system user 302 in the first language. The linguistic analysis circuitry 118 identifies the word or phrase in the first language and determines a corresponding word or phrase in the second language. The prompt generation circuitry 120 then generates an audio output 720 requesting the system user 302 to say the corresponding word or phrase in the second language.

The output signal 712 generated by the sensors 130 includes information and/or data that includes the first language word or phrase spoken by the system user 302. The environmental information and/or data includes information and/or data associated with one or more objects 304 disposed in the environment 310. The linguistic analysis circuitry 118 receives the output signal 712 signal from the sensors 130. Although not depicted in FIG. 7, in some embodiments, context determination circuitry 114 may provide additional information and/or data representative of the environmental context of the first language word or phrase. Such environmental context information may beneficially permit the linguistic analysis circuitry 118 to determine ambiguous first language words or phrases using the environmental context. In embodiments, the context determination circuitry 114 and/or the linguistic analysis circuitry 118 may include AI circuitry 218 that performs first language word or phrase detection and identification. In embodiments, the context determination circuitry 114 and/or the linguistic analysis circuitry 118 and/or the AI circuitry 218 may access one or more data structures, data stores, data tables, and/or databases that include information and/or data useful for identifying first language word or phrases and/or selecting corresponding second language words or phrases. In embodiments, the linguistic analysis circuitry 118 may access AI circuitry 218 disposed in one or more remote devices 290. For example, the linguistic analysis circuitry 118 may communicate with the remote device 290 via network interface circuitry 270 and one or more local area, wide area, and/or worldwide wired and/or wireless networks 280.

After the linguistic analysis circuitry 118 determines the appropriate word or phrase corresponding to the first language word or phrase, the linguistic analysis circuitry 118 communicates an output signal 714 that includes information and/or data requesting the system user 302 to say the equivalent word or phrase in the second language. Upon receipt of the output signal 714, the prompt generation circuitry 120 generates an audio output 720 that includes an audio prompt for the system user to repeat the word or phrase in the second language.

Although not depicted in FIG. 7 for clarity, once the system user 302 speaks the word or phrase in the second language, the linguistic analysis circuitry 118 may assess whether the system user 302 used the correct word or phrase and/or whether the system user 302 used appropriate pronunciation, inflection, and/or tonal quality in speaking the word or phrase. Thus, the language education system 100 may beneficially provide constructive feedback to the system user 302.

FIG. 8 depicts an illustrative data structure 800 used by the context determination circuitry 114 in assessing one or more contextual factors included in the information provided by the sensors 130, in accordance with at least one embodiment described herein. In embodiments, such contextual factors may include but are not limited to: data representative of an emotional state 810, data representative of a social state 820, data representative of a physical state 830, and/or data representative of an emotional state 840. In embodiments, the context determination circuitry 114 may include contextual analysis AI circuitry 218. In embodiments, the contextual analysis AI circuitry 218 may be disposed local to the context determination circuitry 114. In other embodiments, the contextual analysis AI circuitry 218 may be disposed in while or in part in one or more remote devices 290, such as one or more cloud-based servers.

In embodiments, the context determination circuitry 114 may generate data representative of an emotional state 810 of the system user 302 and/or one or more persons in the environment about the system user 302. Such contextual information may be obtained, for example, via one or more biometric sensors (heart rate, respiration, skin moisture, etc.), one or more microphones, and/or one or more image acquisition devices coupled to circuitry to assess an emotional state based on the tone, volume, emphasis, inflection, and/or content of words or phrases spoken by the system user 302 and/or persons in the environment about the system user 302. Such emotional state 810 information may include but is not limited to: data representative of an angry emotional state; data representative of a distracted emotional state; and/or data associated with a bored emotional state.

In embodiments, the context determination circuitry 114 may generate data representative of a social state 820 of the system user 302 and/or one or more persons in the environment about the system user 302. Such contextual information may be obtained, for example, via one or more microphones and/or one or more image acquisition devices and circuitry to assess a social state based on the presence of other persons proximate the system user 302, the number of persons present proximate the system user 302, and/or the language(s) spoken by persons proximate the system user 302.

In embodiments, the context determination circuitry 114 may generate data representative of a physical state 830 of the system user 302 and/or one or more persons in the environment about the system user 302. Such contextual information may be obtained, for example, via one or more biometric sensors (heart rate, respiration, skin moisture, device usage information, device usage history, EKG, etc.), one or more microphones, and/or one or more image acquisition devices coupled to circuitry to assess the physical state of the system user 302. In embodiments, at least a portion of the contextual information may be obtained from one or more wearable devices worn by the system user and communicatively coupled to the processor-based device 200. For example, pulse and/or electrocardiogram information may be obtained from a watch or similar ornament worn by the system user 302.

In embodiments, the context determination circuitry 114 may generate data representative of an educational state 830 of the system user 302 and/or one or more persons in the environment about the system user 302. Such educational context information may be obtained, for example, via a lookup of information on one or more Websites such as LinkedIn® or similar. Such educational contextual information may be obtained, for example, via a lookup in contact information contained on the processor-based device 200. In embodiments, the context determination circuitry 114 may use facial recognition to identify one or more persons proximate the system user 302. The context determination circuitry 114 may then determine educational context information for other persons proximate the system user based on the identification of the persons via facial recognition. In embodiments, at least a portion of the educational context information may include but is not limited to: recently completed education, recent educational success rate, highest level of education completed, and similar.

Figure 9:
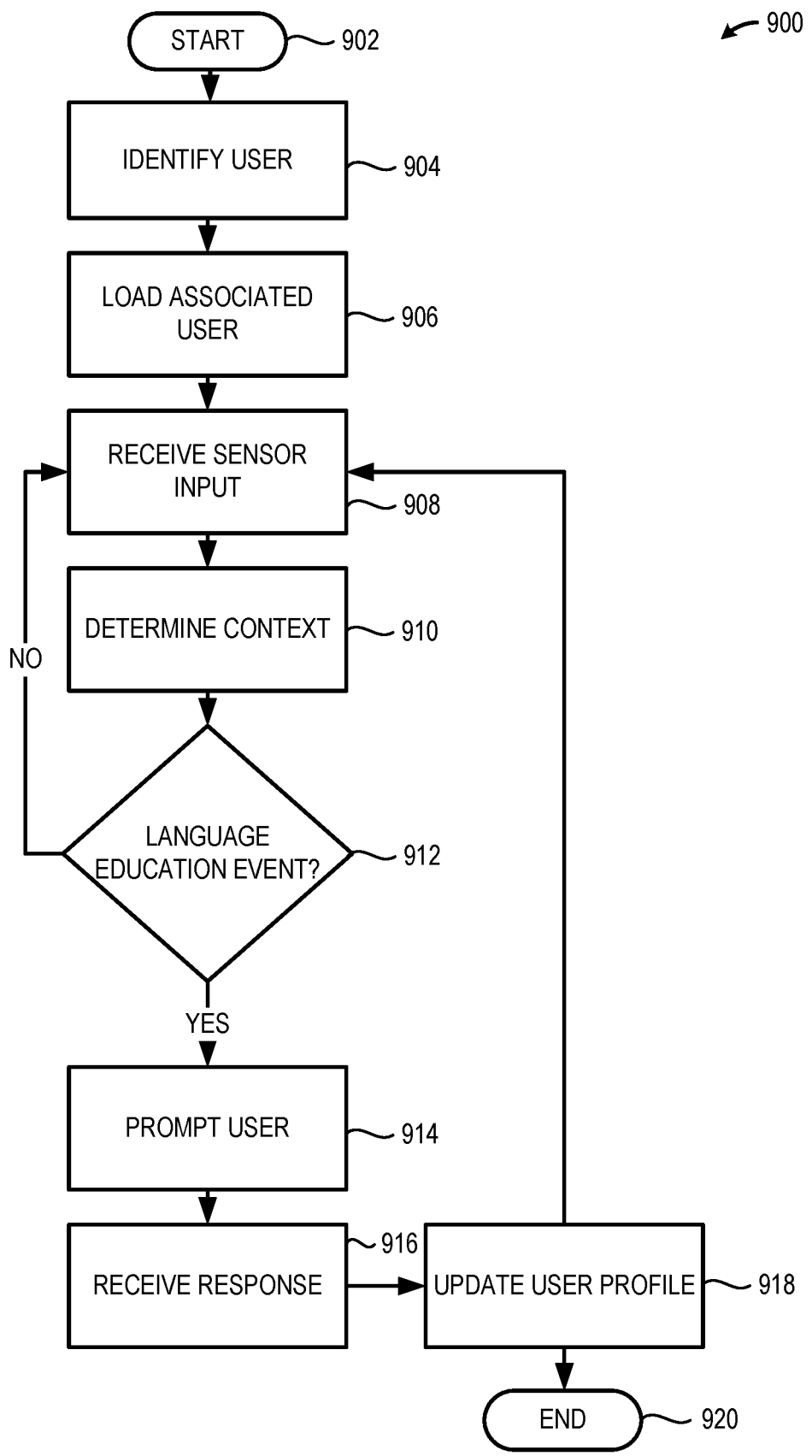
FIG. 9 is a high-level logic flow diagram of an illustrative method of providing a language education session by language education system included in a processor-based device, in accordance with at least one embodiment described herein.

FIG. 9 is a high-level logic flow diagram of an illustrative method 900 of providing a language education session by language education system 100 included in a processor-based device 200, in accordance with at least one embodiment described herein. The method 900 commences at 902.

At 904, the language education system 100 identifies the system user 302. In embodiments, such user identification may be accomplished using one or more biometric identifiers (facial recognition, fingerprint, retinal scan, etc.). In embodiments, such user identification may be accomplished via a user identifier/password combination used to initiate activity with the processor-based device 200 or a user identifier/password combination used to initiate the language education system 100.

At 906, the language education system 100 accesses information indicative of a user profile associated with the system user 302. Such user profile information may include but is not limited to: the first language of the system user 302, one or more second languages the system user seeks to learn or improve proficiency, the level of progress of the system user in the one or more second languages, and similar.

At 908, one or more sensors 130 coupled to the language education system 100 receives information from at least one of: the system user 302 and/or the environment about the system user 302. Such information may be obtained using one or more microphones 224 and/or one or more image acquisition systems 226. The one or more sensors 130 generate at least one output signal containing information and/or data representative of the system user 302 and/or the environment about the system user 302.

At 910, using the at least one output signal provided by the sensors 130, the context determination circuitry 114 in the language education system 100 determines the current context of the system user 302, the environment about the system user 302, and/or one or more persons present in the environment about the system user 302.

At 912, based on the input received at 908 and the context determined at 910, the language education system 100 determines whether a language education event has been initiated by the system user 302. If the language education system 100 determines a language education session has not been initiated, the method 900 returns to 908. If the language education system 100 determines a language education session has been initiated, the method 900 continues at 914.

At 914, the language education system 100 prompts the system user, for example by generating an output that designates an object 304 in the environment previously identified by the object detection/ID circuitry 116 and requesting the system user 302 to speak the word or phrase associated with the designated object 304 in the second language.

At 916, the language education system 100 receives the audible input from the system user 302. The linguistic analysis circuitry 118 determines whether the input provided by the system user 302 is correct.

At 918, if the linguistic analysis circuitry 118 determines the response provided by the system user 302 is correct, the language education system 100 updates the user profile to indicate a successful education session. If the linguistic analysis circuitry 118 determines the response provided by the system user 302 is deficient (incorrect, mispronounced, grammatically incorrect, tonally incorrect, etc.), the language education system 100 updates the user profile to indicate an unsuccessful education session. The method 900 concludes at 920.

Figure 10:
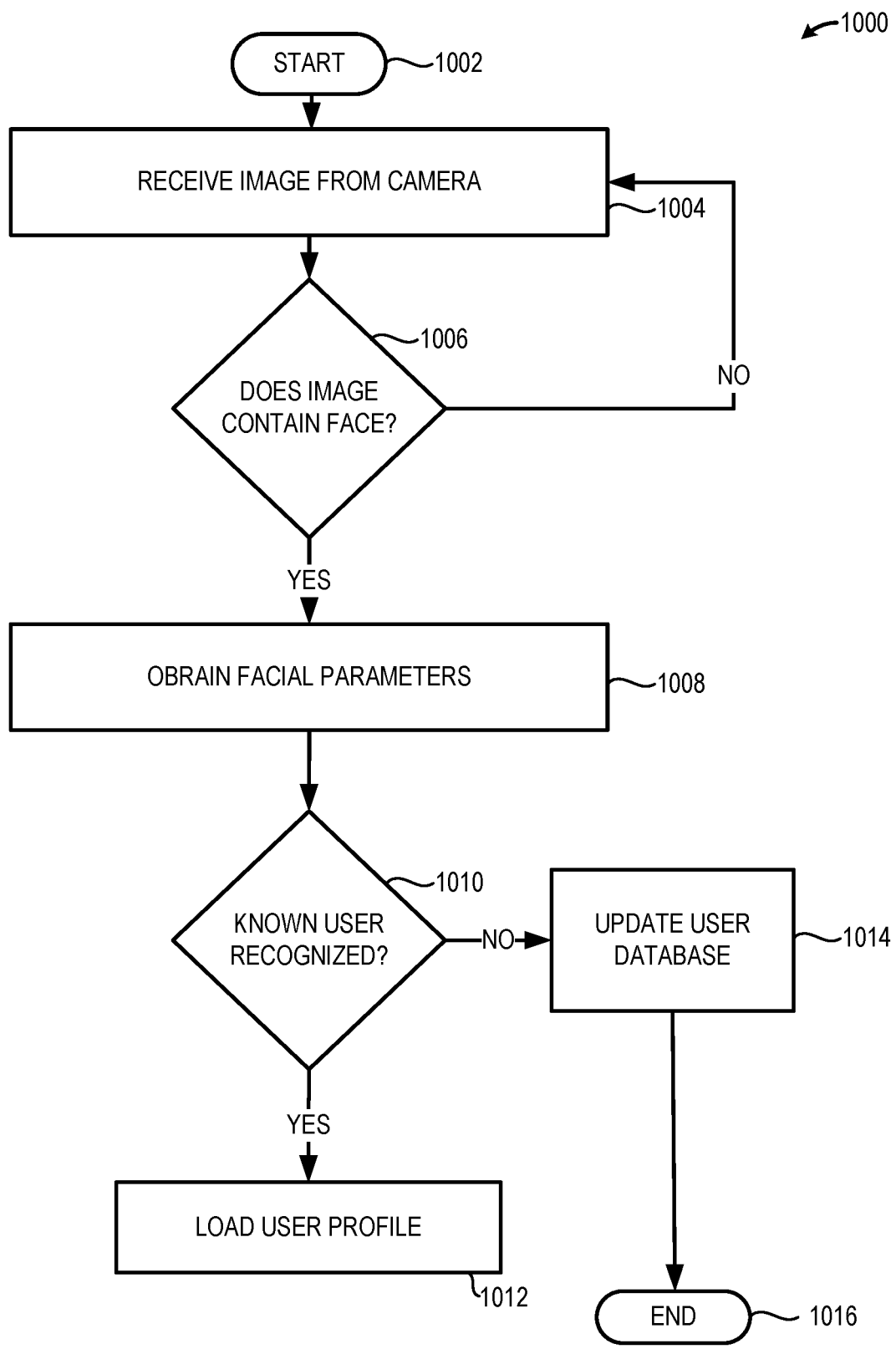
FIG. 10 is a high-level logic flow diagram of an illustrative method of identifying, by the language education system, a system user preparatory to initiating a language education session, in accordance with at least one embodiment described herein.

FIG. 10 is a high-level logic flow diagram of an illustrative method 1000 of identifying, by the language education system 100, a system user 302 preparatory to initiating a language education session, in accordance with at least one embodiment described herein. The method 1000 commences at 1002.

At 1004, the language education system 100 receives information and/or data from one or more sensors 130 disposed in, on, about, or communicatively coupled to the processor-based device 200. In embodiments, the information and/or data may be received from one or more image acquisition devices or cameras 224.

At 1006, the user detection/ID circuitry 112 determines whether received image information and/or data includes information representative of a face. If the received information and/or data does not contain data representative of a face, the method 1000 returns to 1004. If the received information and/or data does contain data representative of a face, the method 1000 continues to 1008.

At 1008, the user detection/ID circuitry 112 and/or communicatively coupled facial recognition AI circuitry 218 obtains facial parameters associated with the system user 302.

At 1010, the user detection/ID circuitry 112 determines whether the obtained facial parameters match a known user. If the user detection/ID circuitry 112 determines the facial parameters match a known system user, the method 1000 continues at 1012. If the user detection/ID circuitry 112 determines the facial parameters do not match a known system user, the method 1000 continues at 1014.

At 1012, responsive to a determination that the received facial parameters match a known user, the language education system 100 loads a user profile corresponding to the system user identified at 1010. The method 1000 then concludes at 1016.

At 1014, responsive to a determination that the received facial parameters do not match a known user, the language education system 100 prompts the user to create a new system user profile. The method 1000 then concludes at 1016.

Figure 11:
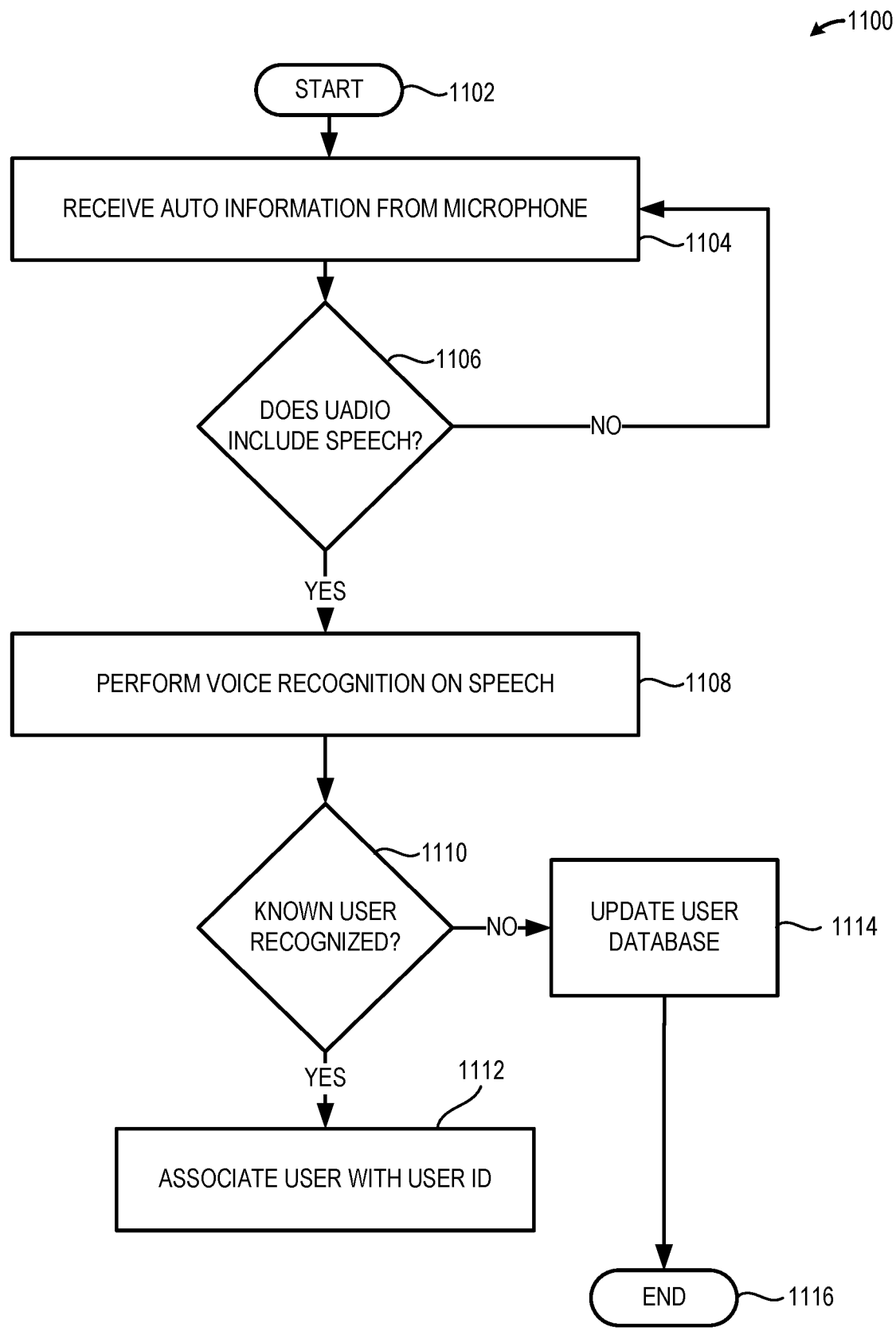
FIG. 11 is a high-level logic flow diagram of an illustrative method of identifying, by the language education system, a system user via voice recognition preparatory to initiating a language education session, in accordance with at least one embodiment described herein.

FIG. 11 is a high-level logic flow diagram of an illustrative method 1100 of identifying, by the language education system 100, a system user 302 via voice recognition preparatory to initiating a language education session, in accordance with at least one embodiment described herein. The method 1100 commences at 1102.

At 1104, the language education system 100 receives audio information including speech, voice, or vocal pattern or parameters from an output signal provided by one or more microphones 226 disposed in, on, about, or communicatively coupled to the processor-based device 200.

At 1106, the user detection/ID circuitry 112 determines whether received speech, voice, or vocal pattern or parameter information includes information representative of a spoken word. If the received speech, voice, or vocal pattern or parameter information does not contain data representative of a spoken word, the method 1100 returns to 1104. If the received speech, voice, or vocal pattern or parameter information does contain data representative of a spoken word, the method 1100 continues to 1108.

At 1108, the user detection/ID circuitry 112 and/or communicatively coupled speech recognition AI circuitry 218 obtains speech, voice, or vocal pattern or parameter information associated with known users.

At 1110, the user detection/ID circuitry 112 determines whether the obtained speech, voice, or vocal patterns or parameters match a known system user. If the user detection/

ID circuitry 112 determines the speech, voice, or vocal patterns or parameters match a known system user, the method 1100 continues at 1112. If the user detection/ID circuitry 112 determines the speech, voice, or vocal patterns or parameters do not match a known system user, the method 1100 continues at 1114.

At 1112, responsive to a determination that the received speech, voice, or vocal patterns or parameters match a known user, the language education system 100 loads a user profile corresponding to the system user identified at 1110. The method 1100 then concludes at 1116.

At 1114, responsive to a determination that the received speech, voice, or vocal patterns or parameters do not match a known user, the language education system 100 prompts the user to create a new system user profile. The method 1100 then concludes at 1116.

Figure 12:
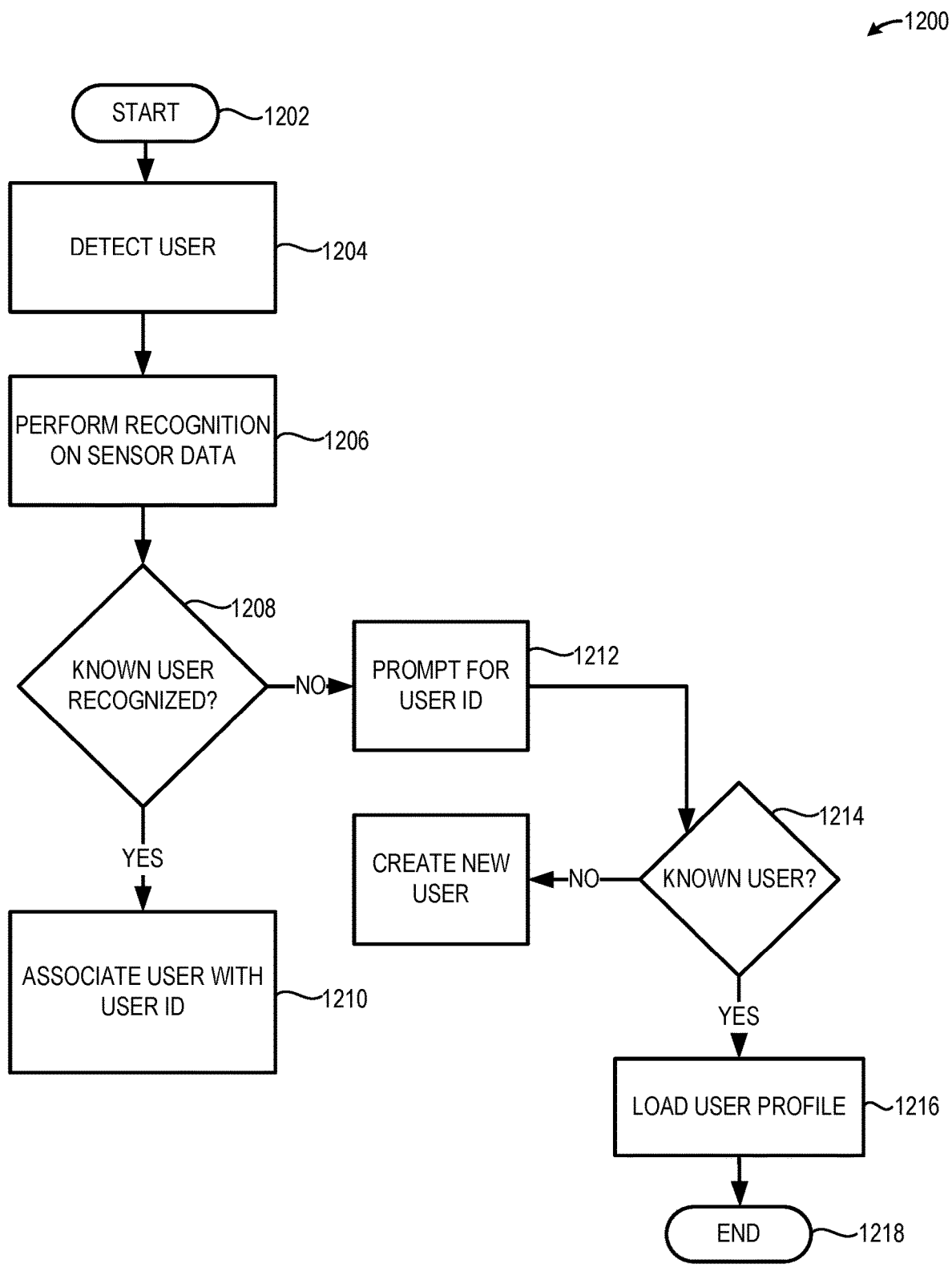
FIG. 12 is a high-level logic flow diagram of an illustrative method of identifying, by the language education system, a system user using sensor data preparatory to initiating a language education session, in accordance with at least one embodiment described herein.

FIG. 12 is a high-level logic flow diagram of an illustrative method 1200 of identifying, by the language education system 100, a system user 302 using sensor data preparatory to initiating a language education session, in accordance with at least one embodiment described herein. The method 1200 commences at 1202.

At 1204, the language education system 100 receives information indicative of a user's desire to interact with the language education system 100 based on sensor output data generated by one or more sensors that are disposed in, on, or about the processor-based device 200 and/or one or more external sensors 130 communicatively coupled to the processor-based device 200.

At 1206, the user detection/ID circuitry 112 and/or user analysis AI circuitry 218 communicatively coupled to the user detection/ID circuitry 112 compares the data received from the one or more sensors 130 with user data contained, retained, or stored in one or more data tables, data stores, data structures, or databases.

At 1208, if the user detection/ID circuitry 112 determines whether the received sensor data sufficiently corresponds to a known system user. If the user detection/ID circuitry 112 determines the received sensor data sufficiently corresponds to a known system user, the method 1200 continues at 1210. If the user detection/ID circuitry 112 determines the received sensor data does not sufficiently correspond to a known system user, the method 1200 continues at 1212.

At 1210, responsive to a determination at 1208 that the received sensor data sufficiently corresponds to a known user, the user detection/ID circuitry 112 causes a user profile corresponding to the system user identified at 1208 to load into the language education system 100. The method 1200 then concludes at 1220.

At 1212, responsive to a determination at 1208 that the received sensor data fails to sufficiently correspond to sensor data associated with a known user, the user detection/ID circuitry 112 prompts the user for one or more credentials, such as a user identifier and password.

At 1214, the user detection/ID circuitry 112 determines whether the one or more received user credentials match the credentials associated with a known system user. If the user detection/ID circuitry 112 determines the one or more user credentials match a known system user, the method 1200 continues at 1218. If the user detection/ID circuitry 112 determines the one or more user credentials do not match a known system user, the method 1200 continues at 1216.

At 1216, responsive to a determination by the user detection/ID circuitry 112 that the received one or more user credentials do not match a known system user, the user detection/ID circuitry 112 requests the system user to create a new user profile. The method 1200 then concludes at 1220.

At 1218, responsive to a determination by the user detection/ID circuitry 112 that the received one or more user credentials matches a known system user, the user detection/ID circuitry 112 loads the respective system user profile. The method 1200 then concludes at 1220.

Figure 13:
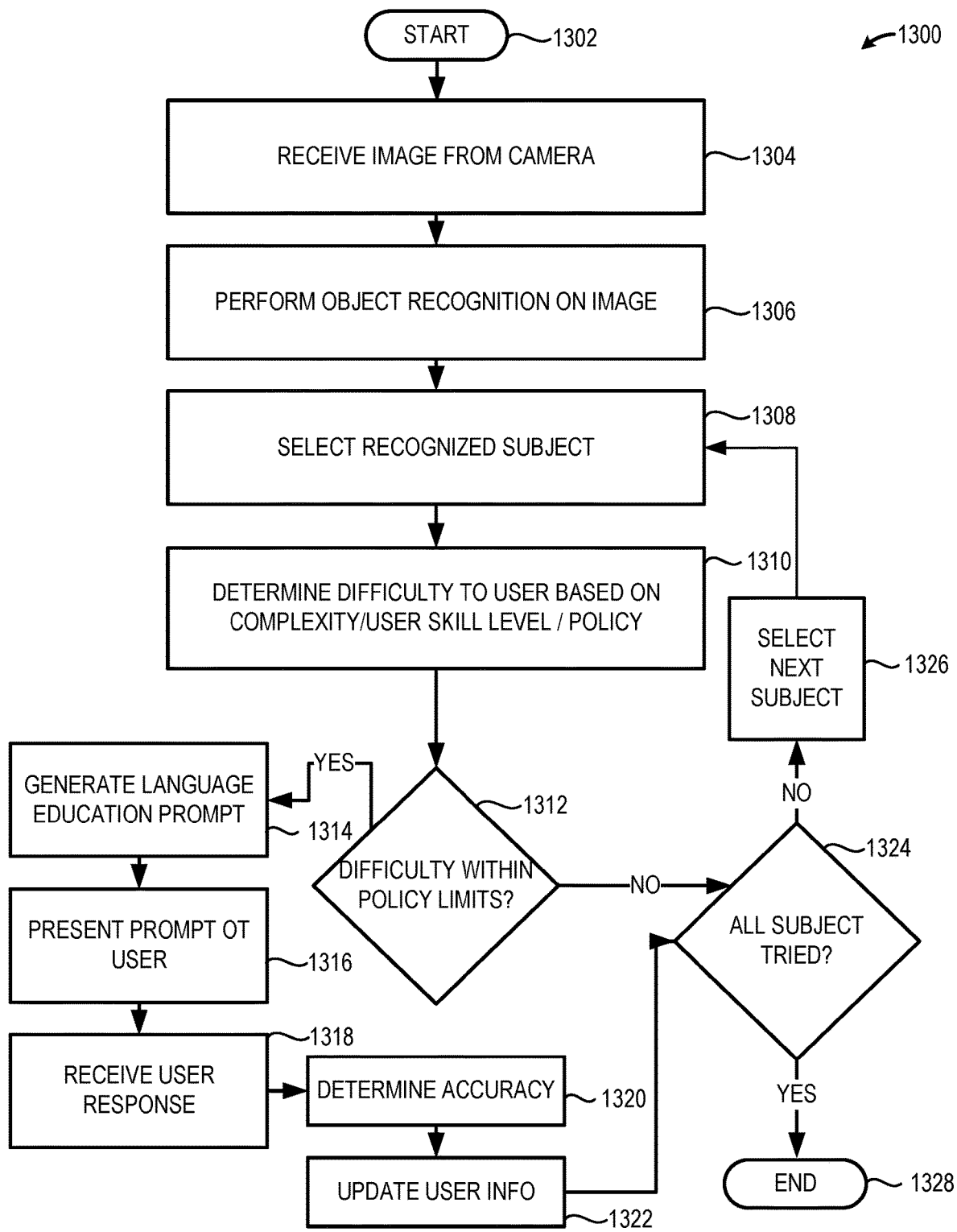
FIG. 13 is a high-level logic flow diagram of an illustrative method of performing a language education session in which the language education system detects, identifies, and selects an object in the environment about the system user, and requests the system user identify the selected object, in accordance with at least one embodiment described herein.

FIG. 13 is a high-level logic flow diagram of an illustrative method 1300 of performing a language education session in which the language education system 100 detects, identifies, and selects an object 304 in the environment 310 about the system user 302, and requests the system user identify the selected object 304, in accordance with at least one embodiment described herein. The method 1300 commences at 1302.

At 1304, the object detection/ID circuitry 116 receives image information from one or more image acquisition devices 224. The image information includes information and/or data associated with one or more objects 304 disposed in the environment 310 about the system user 302.

At 1306, the object detection/ID circuitry 116 and/or object detection and identification AI circuitry 218 detects and identifies at least some of the one or more objects 304 included in the received sensor data. In embodiments, the object detection and identification AI circuitry 218 may be disposed local to the language education system 100. In other embodiments, the object detection and identification AI circuitry 218 may be disposed remotely, for example in one or more cloud-based servers 290.

At 1308, the object detection/ID circuitry 116 selects one of the identified objects 304 included in the received image data.

At 1310, the linguistic analysis circuitry 118 determines the second language word or phrase associated with the identified object selected at 1308. The linguistic analysis circuitry 118 then determines one or more values representative of the difficulty of the second language word or phrase relative to the overall second language proficiency of the system user 302.

At 1312, the linguistic analysis circuitry 118 determines whether the one or more values representative of the relative difficulty of the second language word or phrase with respect to the proficiency of the system user 302 fall within an allowable range based on one or more policy limits associated with the respective system user 302. If the one or more values representative of the relative difficulty of the second language word or phrase fall within the allowable policy limits associated with the system user 302 (i.e., the word or phrase is not deemed "too difficult" with respect to the user's proficiency), the method 1300 continues at 1314. If the one or more values representative of the relative difficulty of the second language word or phrase fall outside the allowable policy limits associated with the system user 302 (i.e., the word or phrase is deemed "too difficult" with respect to the user's proficiency), the method 1300 continues at 1324.

At 1314, the prompt generation circuitry 120 generates a language education prompt. In embodiments, the prompt may include one or more first language words and/or images that are provided on a display screen of the processor-based device 200. In other embodiments, the prompt may include one or more first language words and/or images that are projected by the processor-based device 200 on a nearby surface such as a wall, countertop, or table top. In embodiments, the prompt may include one or more first language audio outputs requesting the user to provide the second language word or phrase associated with the object selected at 1308.

At 1316, the prompt generation circuitry 120 presents the audio and/or visual prompt to the system user 302.

At 1318, the language education system 100 receives the system user response in the second language.

At 1320, the linguistic analysis circuitry 118 determines whether the system user's response in the second language includes the correct word or phrase that describes the object 304 selected at 1308. In embodiments, the linguistic analysis circuitry 118 may also determine whether one or more second language parameters (tone, voice, inflection, accent, etc.) are correct for the word or phrase that describes the object 304 selected at 1308.

At 1322, the linguistic analysis circuitry 118 updates the user profile associated with the current system user 302 to reflect the correct/incorrect answer provided by the system user 302 at 1318.

At 1324, the object detection/ID circuitry 116 determines whether any identified objects 304 remain in the image data received at 1304. If identified objects 304 remain in the image data received at 1304, the method 1300 continues at 1326. If no identified objects 304 remain in the image data received at 1304, the method 1300 concludes at 1328.

At 1326, the object detection/ID circuitry 116 selects another object identified at 1306. The method 1300 then continues at 1308.

Figure 14:
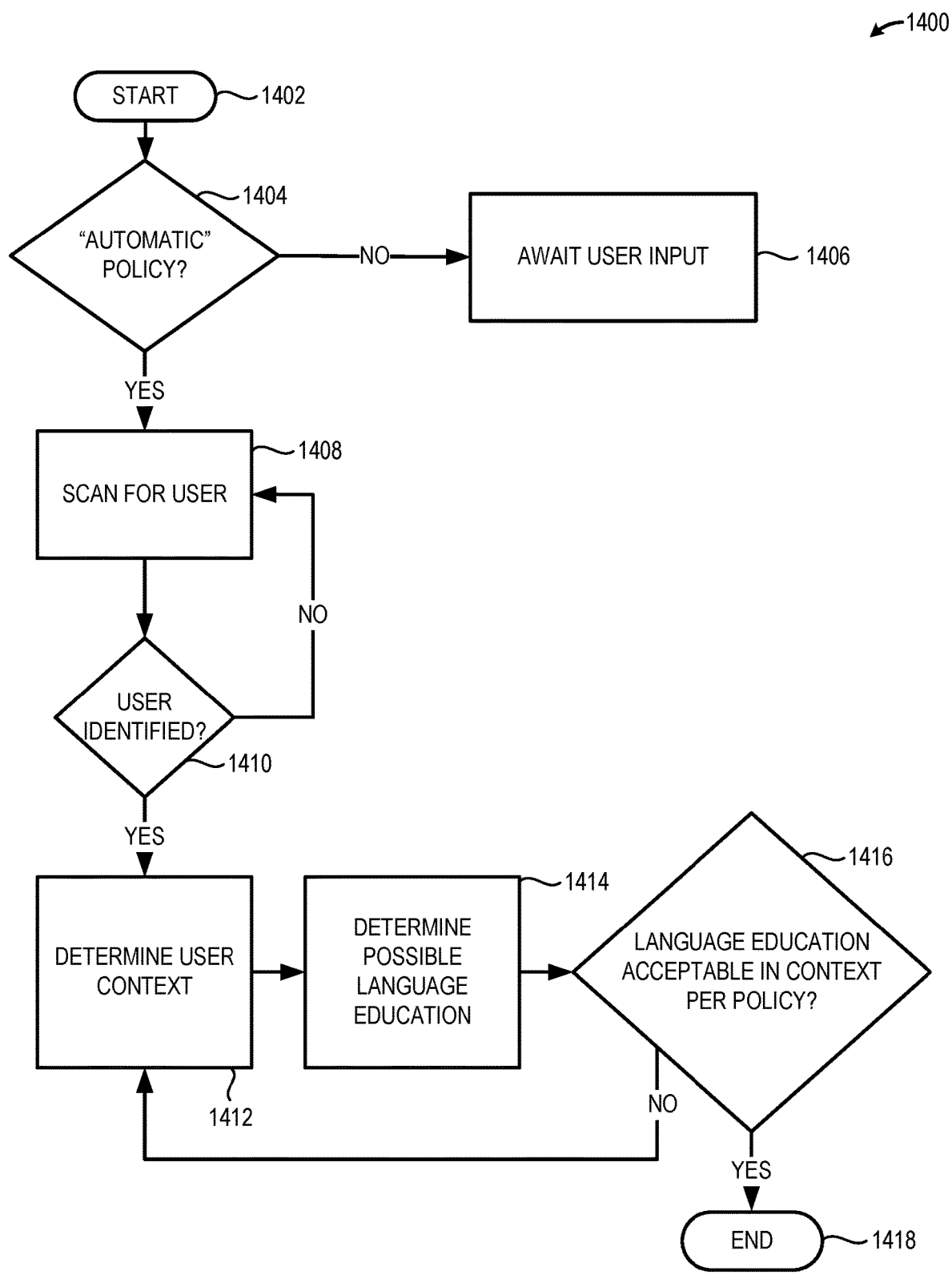
FIG. 14 is a high-level flow diagram of an illustrative method of applying one or more language education policies by the context determination circuitry, in accordance with at least one embodiment described herein.

FIG. 14 is a high-level flow diagram of an illustrative method 1400 of applying one or more language education policies by the context determination circuitry 114, in accordance with at least one embodiment described herein. At times, it may be advantageous to apply a language education policy based on one or more environmental and/or biometric factors sensed by the language education system 100. Such times may include, for example, when the system user 302 is a minor and certain language is precluded by the context determination circuitry 114. Such times may include, for example, when the system user 302 is in a quiet or silent environment, such as a church or movie theatre. In embodiments, the language education system 100 may include an automatic policy in which the language education system 100 commences with language education upon detecting a system user or a manual policy in which language education must be manually commenced. The method 1400 commences at 1402.

At 1404, the context determination circuitry 114 determines whether the language education system 100 policy is configured as an automatic language education policy or a manual language education policy. If the language education system 100 policy is set to automatic language education, the language education system 100 detects the presence of the system user 302 and autonomously enters a language education mode. In contrast, if the language education system 100 policy is set to manual language education, the language education system 100 enters the language education mode only when requested by the system user 302. If the language education system 100 policy is set to an automatic language education policy, the method 1400 proceeds to 1406. If the language education system 100 policy is set to a manual language education policy, the method 1400 proceeds to 1408.

At 1406, the language education system 100 remains in a standby mode pending receipt of credentials from a system user 302.

At 1408, the language education system 100 autonomously enters the language education mode upon detecting the presence of the system user 302. The presence of the system user 302 may be detected, for example, using one or more image acquisition sensors, one or more fingerprint sensors, or similar. In embodiments, the language education system 100 may cause the processor-based device 200 to actively scan for the presence of a system user 302.

At 1410, the user detection/ID circuitry 112 determines whether a system user 302 has been detected and identified by the user detection/ID circuitry 112 based on information and/or data received from one or more sensors disposed in, on, or about the processor-based device 200 or communicatively coupled to the processor-based device 200. If the language education system 100 is in an automatic language education policy mode and the system user 302 has been detected and identified at 1410 the method 1400 continues at 1412. If the language education system 100 is in the automatic language education policy mode and the system user 302 is not identified at 1410, the method 1400 returns to 1408.

At 1412, the context determination circuitry 114 determines a context associated with the system user 302. In embodiments, such context information may include but is not limited to, identification of the first language of the user 302; identification of the second language(s) for the user 302; identification of any limitations on the language education of the user 302; identification of environmental factors associated with the user 302 and impacting the delivery of language education by the language education system 100; and similar.

At 1414, the language education system 100 determines one or more proposed language education selections for the system user 302.

At 1416, the language education system 100 determines whether the proposed language education selection is permissible based on one or more policies associated with the system user 302. For example, if the context determination circuitry 114 determines the system user 302 is a minor, and the proposed language education selection is "adults only," the context determination circuitry 114 precludes the delivery of the proposed language education selection to the system user 302. In another example, if the context determination circuitry 114 determines from context information such as geolocation information and/or calendar information that the system user 302 is located in a movie theatre (i.e., a "silent zone"), the context determination circuitry 114 may preclude the delivery of the proposed language education selection. If the context determination circuitry 114 determines the policy precludes the delivery of the proposed language education selection based on context information, the method 1400 returns to 1412. If the context determination circuitry 114 determines the policy permits the delivery of the proposed language education selection, the method 1400 terminates at 1418.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for learning languages in a smart space environment.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for forming magnetically lined through-holes in a semiconductor package substrate.

According to example 1, there is provided a language education system. The system may include: I/O interface circuitry to receive sensor information and provide a second language education output; context determination circuitry to determine a second language context based on the received sensor information; linguistic analysis circuitry to initiate a second language education event using the received sensor information and the determined second language context; and prompt generation circuitry to generate the second language education output based on the received sensor information and the determined context.

Example 2 may include elements of example 1 and the system may further include: user detection/ID circuitry to determine an identity of a system user and determine one or more second language parameters associated with the system user; where the linguistic analysis circuitry to further initiate the second language education event using the received sensor information, the determined second language context, and the determined one or more second language parameters.

Example 3 may include elements of any of examples 1 or 2 where the user detection/ID circuitry to autonomously determine the identity of the system user based on sensor information that includes one or more biometric parameters.

Example 4 may include elements of any of examples 1 through 3 and the system may additionally include: object detection/ID circuitry to autonomously detect and identify one or more objects based on sensor information; where the linguistic analysis circuitry to further initiate the second language education event using the received sensor information, the determined second language context, the determined one or more second language parameters, and an identified object.

Example 5 may include elements of any of examples 1 through 4 where the I/O interface circuitry includes at least one communicatively coupled projector; and the prompt generation circuitry to cause the least one communicatively coupled projector to generate a visual second language education output associated with the identified object and projected on a surface proximate the identified object.

Example 6 may include elements of any of examples 1 through 5 where the I/O interface circuitry includes a communicatively coupled object designator; and the prompt generation circuitry to cause the least one communicatively coupled object designator to designate the identified object and generate a visual second language education output associated with the designated identified object.

Example 7 may include elements of any of examples 1 through 6 where the I/O interface circuitry includes a communicatively coupled loudspeaker; and the prompt generation circuitry to cause the least one communicatively coupled loudspeaker to generate an audible second language education output.

Example 8 may include elements of any of examples 1 through 7 where the I/O interface circuitry includes a communicatively coupled audio input device to receive an audible output by the system user; and the linguistic analysis circuitry to further: receive a signal from the communicatively coupled audio input device that includes information representative of the system user's second language response to the second language education output; and provide feedback to the system user on the user's second language response, the feedback including at least one of information on: correct/incorrect second language word choice; correct/incorrect second language word pronunciation; correct/incorrect second language word usage; correct/incorrect second language grammar; and correct/incorrect second language word tone or accent.

Example 9 may include elements of any of examples 1 through 8 where the context determination circuitry determines one or more personal contextual parameters associated with a person conversing with the system user based on the received sensor information; and the linguistic analysis circuitry initiates the second language education event based on the determined one or more personal contextual parameters including at least one of: an age of the person conversing with the system user; a gender of the person conversing with the system user; and a social status of the person conversing with the system user.

Example 10 may include elements of any of examples 1 through 9 where the context determination circuitry determines one or more environmental contextual parameters associated with an environment about the system user based on the received sensor information; and the linguistic analysis circuitry initiates the second language education event based on the determined one or more environmental parameters including at least one of: a location where silence is expected; an event where silence is expected; a location where high ambient light levels precludes the use of a second language event visual output; a formal location where colloquial language is not acceptable; an informal location where colloquial language is acceptable.

According to example 11, there is provided a non-transitory storage device. The non-transitory storage device includes machine-readable instructions that, when executed by language education circuitry may cause the language education circuitry to: receive sensor information responsive to a request to initiate a second language education event; determine a second language context based on the received sensor information; initiate a second language education event using the received sensor information and the determined second language context; and generate a second language education output based on the received sensor information and the determined context.

Example 12 may include elements of example 11 where the machine-readable instructions may further cause the language education circuitry to: determine an identity of a system user; determine one or more second language parameters associated with the system user; and where the machine-readable instructions that cause the language education circuitry to initiate a second language education event using the received sensor information and the determined second language context further cause the language education circuitry to: initiate the second language education event using the received sensor information, the determined second language context, and the determined one or more second language parameters.

Example 13 may include elements of any of examples 11 or 12 where the machine-readable instructions that cause the language education circuitry to determine the identity of a system user further cause the language education circuitry to: autonomously determine the identity of the system user based on sensor information that includes one or more biometric parameters.

Example 14 may include elements of any of examples 11 through 13 where the machine-readable instructions further cause the language education circuitry to: autonomously detect an object disposed in an environment about the system user based on sensor information; and autonomously identify the detected object; where the machine-readable instructions that cause the language education circuitry to initiate the second language education event using the received sensor information and the determined second language context further cause the language education circuitry to: initiate the second language education event using the received sensor information, the determined second language context, the determined one or more second language parameters, and an identified object.

Example 15 may include elements of any of examples 11 through 14 where the machine-readable instructions that cause the language education circuitry to generate the second language education output based on the received sensor information and the determined context further cause the language education circuitry to: generate a signal that includes a visual second language education output associated with the identified object; and where the machine-readable instructions that cause the language education circuitry to provide the second language education output further cause the language education circuitry to: provide the signal that includes the visual second language education output to a communicatively coupled projector to project the visual second language education output on a surface proximate the identified object.

Example 16 may include elements of any of examples 11 through 15 where the machine-readable instructions that cause the language education circuitry to generate the second language education output based on the received sensor information and the determined context further cause the language education circuitry to: generate a signal that includes a second language education designator associated with the identified object; and where the machine-readable instructions that cause the language education circuitry to provide the second language education output further cause the language education circuitry to: provide the signal that includes the second language education designator associated with the identified object to a communicatively coupled designator to designate the object associated with the second language education output.

Example 17 may include elements of any of examples 11 through 16 where the machine-readable instructions that cause the language education circuitry to generate the second language education output based on the received sensor information and the determined context further cause the language education circuitry to: generate a signal that includes an audible second language education output; and where the machine-readable instructions that cause the language education circuitry to provide the second language education output further cause the language education circuitry to: provide the signal that includes the audible second language education output to a communicatively coupled loudspeaker.

Example 18 may include elements of any of examples 11 through 17 where the machine-readable instructions further cause the language education circuitry to: receive a signal from a communicatively coupled audio input device that includes information representative of the system user's second language response to the second language education output; and generate an output signal that includes information representative of feedback to the system user on the user's second language response, the feedback including at least one of information on: correct/incorrect second language word choice; correct/incorrect second language word pronunciation; correct/incorrect second language word usage; correct/incorrect second language grammar; and correct/incorrect second language word tone or accent.

Example 19 may include elements of any of examples 11 through 18 where the machine-readable instructions further cause the language education circuitry to: determine one or more personal contextual parameters associated with a person conversing with the system user based on the received sensor information, the one or more personal contextual parameters including at least one of: an age of the person conversing with the system user; a gender of the person conversing with the system user; and a social status of the person conversing with the system user; and where the machine-readable instructions that cause the language education circuitry to initiate the second language education event using the received sensor information and the determined second language context further cause the language education circuitry to: initiate the second language education event based on the determined one or more personal contextual parameters.

Example 20 may include elements of any of examples 11 through 19 where the machine-readable instructions further cause the language education circuitry to: determine one or more environmental contextual parameters associated with an environment about the system user based on the received sensor information, the one or more environmental contextual parameters including at least one of: a location where silence is expected; an event where silence is expected; a location where high ambient light levels precludes the use of a second language event visual output; a formal location where colloquial language is not acceptable; an informal location where colloquial language is acceptable; and where the machine-readable instructions that cause the language education circuitry to initiate the second language education event using the received sensor information and the determined second language context further cause the language education circuitry to: initiate the second language education event based on the determined one or more environmental parameters.

According to example 21, there is provided a language education system. The system may include: means for receiving sensor information; means for determining a second language context based on the received sensor information; means for initiating a second language education event using the received sensor information and the determined second language context; means for generating a second language education output based on the received sensor information and the determined context; and means for providing the second language education output.

Example 22 may include elements of example 21, and the system may additionally include: means for determining an identity of a system user; means for determining one or more second language parameters associated with the system user; and wherein the means for initiating a second language education event using the received sensor information and the determined second language context further comprises: means for initiating the second language education event using the received sensor information, the determined second language context, and the determined one or more second language parameters.

Example 23 may include elements of any of examples 21 or 22 where the means for determining an identity of a system user further comprises: means for autonomously determining the identity of the system user based on sensor information that includes one or more biometric parameters.

Example 24 may include elements of any of examples 21 through 23 and the system may additionally include: means for autonomously detecting an object disposed in an environment about the system user based on sensor information; and means for autonomously identifying, by the object detection/ID circuitry, the detected object; wherein the means for initiating the second language education event using the received sensor information and the determined second language context further comprises: means for initiating the second language education event using the received sensor information, the determined second language context, the determined one or more second language parameters, and an identified object.

Example 25 may include elements of any of examples 21 through 24 where the means for generating a second language education output based on the received sensor information and the determined context comprises: means for generating a signal that includes a visual second language education output associated with the identified object; and where the means for providing the second language education output comprises: means for providing the signal that includes the visual second language education output to a communicatively coupled projector to project the visual second language education output on a surface proximate the identified object.

Example 26 may include elements of any of examples 21 through 25 where the means for generating a second language education output based on the received sensor information and the determined context comprises: means for generating a signal that includes a second language education designator associated with the identified object; and where the means for providing the second language education output comprises: means for providing the signal that includes the second language education designator associated with the identified object to a communicatively coupled designator to designate the object associated with the second language education output.

Example 27 may include elements of any of examples 21 through 26 where the means for generating a second language education output based on the received sensor information and the determined context comprises: means for generating a signal that includes an audible second language education output; and where the means for providing the second language education output comprises: means for providing the signal that includes the audible second language education output to a communicatively coupled loudspeaker.

Example 28 may include elements of any of examples 21 through 27 and the system may further include: means for receiving a signal from a communicatively coupled audio input device that includes information representative of the system user's second language response to the second language education output; and means for generating an output signal that includes information representative of feedback to the system user on the user's second language response, the feedback including at least one of information on: correct/incorrect second language word choice; correct/incorrect second language word pronunciation; correct/incorrect second language word usage; correct/incorrect second language grammar; and correct/incorrect second language word tone or accent.

Example 29 may include elements of any of examples 21 through 28 and the system may additionally include: means for determining one or more personal contextual parameters associated with a person conversing with the system user based on the received sensor information, the one or more personal contextual parameters including at least one of: an age of the person conversing with the system user; a gender of the person conversing with the system user; and a social status of the person conversing with the system user; and where the means for initiating the second language education event using the received sensor information and the determined second language context comprises: means for initiating the second language education event based on the determined one or more personal contextual parameters.

Example 30 may include elements of any of examples 21 through 29 and the system may additionally include: means for determining one or more environmental contextual parameters associated with an environment about the system user based on the received sensor information, the one or more environmental contextual parameters including at least one of: a location where silence is expected; an event where silence is expected; a location where high ambient light levels precludes the use of a second language event visual output; a formal location where colloquial language is not acceptable; an informal location where colloquial language is acceptable; and where the means for initiating the second language education event using the received sensor information and the determined second language context comprises: means for initiating the second language education event based on the determined one or more environmental parameters.

According to example 31, there is provided a language education method. The method may include: receiving, by I/O interface circuitry, sensor information; determining, by context determination circuitry, a second language context based on the received sensor information; initiating, by linguistic analysis circuitry, a second language education event using the received sensor information and the determined second language context; generating, by prompt generation circuitry, a second language education output based on the received sensor information and the determined context; and providing, via the I/O interface circuitry the second language education output.

Example 32 may include elements of example 31 and the method may additionally include: determining, by user detection/ID circuitry, an identity of a system user; determining, by the user detection/ID circuitry, one or more second language parameters associated with the system user; and where initiating a second language education event using the received sensor information and the determined second language context further comprises: initiating, by the linguistic analysis circuitry, the second language education event using the received sensor information, the determined second language context, and the determined one or more second language parameters.

Example 33 may include elements of any of examples 31 or 32 where determining an identity of a system user further comprises: autonomously determining, by the user detection/ID circuitry, the identity of the system user based on sensor information that includes one or more biometric parameters.

Example 34 may include elements of any of examples 31 through 33 and the method may additionally include: autonomously detecting, by object detection/ID circuitry an object disposed in an environment about the system user based on sensor information; and autonomously identifying, by the object detection/ID circuitry, the detected object; where initiating the second language education event using the received sensor information and the determined second language context further comprises: initiating, by the linguistic analysis circuitry, the second language education event using the received sensor information, the determined second language context, the determined one or more second language parameters, and an identified object.

Example 35 may include elements of any of examples 31 through 34 where generating a second language education output based on the received sensor information and the determined context comprises: generating, by the prompt generation circuitry, a signal that includes a visual second language education output associated with the identified object; and wherein providing the second language education output comprises: providing, via the I/O interface circuitry, the signal that includes the visual second language education output to a communicatively coupled projector to project the visual second language education output on a surface proximate the identified object.

Example 36 may include elements of any of examples 31 through 35 where generating a second language education output based on the received sensor information and the determined context comprises: generating, by the prompt generation circuitry, a signal that includes a second language education designator associated with the identified object; and wherein providing the second language education output comprises: providing, via the I/O interface circuitry, the signal that includes the second language education designator associated with the identified object to a communicatively coupled designator to designate the object associated with the second language education output.

Example 37 may include elements of any of examples 31 through 36 where generating a second language education output based on the received sensor information and the determined context comprises: generating, by the prompt generation circuitry, a signal that includes an audible second language education output; and wherein providing the second language education output comprises: providing, via the I/O interface circuitry, the signal that includes the audible second language education output to a communicatively coupled loudspeaker.

Example 38 may include elements of any of examples 31 through 37 and the method may additionally include: receiving, by the I/O interface circuitry, a signal from a communicatively coupled audio input device that includes information representative of the system user's second language response to the second language education output; and generating, by the linguistic analysis circuitry, an output signal that includes information representative of feedback to the system user on the user's second language response, the feedback including at least one of information on: correct/incorrect second language word choice; correct/incorrect second language word pronunciation; correct/incorrect second language word usage; correct/incorrect second language grammar; and correct/incorrect second language word tone or accent.

Example 39 may include elements of any of examples 31 through 38 and the method may additionally include: determining, by the context determination circuitry, one or more personal contextual parameters associated with a person conversing with the system user based on the received sensor information, the one or more personal contextual parameters including at least one of: an age of the person conversing with the system user; a gender of the person conversing with the system user; and a social status of the person conversing with the system user; and wherein initiating the second language education event using the received sensor information and the determined second language context comprises: initiating, by the linguistic analysis circuitry, the second language education event based on the determined one or more personal contextual parameters.

Example 40 may include elements of any of examples 31 through 39 and the method may additionally include: determining, by the context determination circuitry, one or more environmental contextual parameters associated with an environment about the system user based on the received sensor information, the one or more environmental contextual parameters including at least one of: a location where silence is expected; an event where silence is expected; a location where high ambient light levels precludes the use of a second language event visual output; a formal location where colloquial language is not acceptable; an informal location where colloquial language is acceptable; and wherein initiating the second language education event using the received sensor information and the determined second language context comprises: initiating, by the linguistic analysis circuitry, the second language education event based on the determined one or more environmental parameters.

According to example 41, there is provided a processor-based electronic device. The device may include: processor circuitry; one or more sensors; and language education circuitry coupled to the processor circuitry and the one or more sensors, the language education circuitry including: I/O interface circuitry to receive sensor information and provide a second language education output; context determination circuitry to determine a second language context based on the received sensor information; linguistic analysis circuitry to initiate a second language education event using the received sensor information and the determined second language context; and prompt generation circuitry to generate the second language education output based on the received sensor information and the determined context.

Example 42 may include elements of example 41 where the language education circuitry further includes: user detection/ID circuitry to determine an identity of a system user and determine one or more second language parameters associated with the system user; and wherein the linguistic analysis circuitry to further initiate the second language education event using the received sensor information, the determined second language context, and the determined one or more second language parameters.

Example 43 may include elements of any of examples 41 or 42 where the user detection/ID circuitry autonomously determines the identity of the system user based on sensor information that includes one or more biometric parameters.

Example 44 may include elements of any of examples 41 through 43 where the language education circuitry further includes: object detection/ID circuitry to autonomously detect and identify one or more objects based on sensor information; wherein the linguistic analysis circuitry to further initiate the second language education event using the received sensor information, the determined second language context, the determined one or more second language parameters, and an identified object.

Example 45 may include elements of any of examples 41 through 44 and the device may further include: at least one projector communicatively coupled to the I/O interface circuitry; wherein the prompt generation circuitry to cause the least one communicatively coupled projector to generate a visual second language education output associated with the identified object and projected on a surface proximate the identified object.

Example 46 may include elements of any of examples 41 through 45 and the device may additionally include: at least one object designator communicatively coupled to the I/O interface circuitry; wherein the prompt generation circuitry to cause the least one communicatively coupled object designator to designate the identified object and generate a visual second language education output associated with the designated identified object.

Example 47 may include elements of any of examples 41 through 46 and the device may additionally include: at least one loudspeaker communicably coupled to the I/O interface circuitry; wherein the prompt generation circuitry to cause the least one communicatively coupled loudspeaker to generate an audible second language education output.

Example 48 may include elements of any of examples 41 through 47 and the device may additionally include: an audio input device communicatively coupled to the I/O interface circuitry to receive an audible output by the system user; and wherein the linguistic analysis circuitry to further: receive a signal from the communicatively coupled audio input device that includes information representative of the system user's second language response to the second language education output; and provide feedback to the system user on the user's second language response, the feedback including at least one of information on: correct/incorrect second language word choice; correct/incorrect second language word pronunciation; correct/incorrect second language word usage; correct/incorrect second language grammar; and correct/incorrect second language word tone or accent.

Example 49 may include elements of any of examples 41 through 48 where the context determination circuitry determines one or more personal contextual parameters associated with a person conversing with the system user based on the received sensor information; and wherein the linguistic analysis circuitry initiates the second language education event based on the determined one or more personal contextual parameters including at least one of: an age of the person conversing with the system user; a gender of the person conversing with the system user; and a social status of the person conversing with the system user.

Example 50 may include elements of any of examples 41 through 49 where the context determination circuitry determines one or more environmental contextual parameters associated with an environment about the system user based on the received sensor information; and wherein the linguistic analysis circuitry initiates the second language education event based on the determined one or more environmental parameters including at least one of: a location where silence is expected; an event where silence is expected; a location where high ambient light levels precludes the use of a second language event visual output; a formal location where colloquial language is not acceptable; an informal location where colloquial language is acceptable.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable circuitry devices (PLD), digital signal processors (DSP), field programmable gate array (FPGA), circuitry gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:
1. A language education system comprising:
I/O interface circuitry to receive sensor information and transmit a second language education output;
context determination circuitry to determine a second language context based on the sensor information;
linguistic analysis circuitry to initiate a second language education event using the sensor information and the second language context;
prompt generation circuitry to generate the second language education output based on the received sensor information and the second language context, the second language education output including a visual second language education output;
user detection/ID circuitry to:
  determine an identity of a user; and
  determine one or more second language parameters associated with the user; and
object detection/ID circuitry to detect and identify one or more objects based on the sensor information,
  the linguistic analysis circuitry to initiate the second language education event using the sensor information, the second language context, the one or more second language parameters, and an identified object;
  the I/O interface circuitry communicatively coupled to at least one projector; and
  the prompt generation circuitry to cause the least one projector to project the visual second language education output on a surface proximate the identified object.

2. The system of claim 1, wherein
the linguistic analysis circuitry is to associate the identified object with the second language based on the one or more second language parameters.

3. The system of claim 1, wherein the user detection/ID circuitry is to determine the identity of the user based on the sensor information, the sensor information including one or more biometric parameters.

4. The system of claim 1, wherein:
the second language education output includes an audible second language education output;
the I/O interface circuitry is communicatively coupled to at least one loudspeaker; and
the prompt generation circuitry is to cause the least one loudspeaker to output the audible second language education output.

5. The system of claim 1, wherein the I/O interface circuitry is communicatively coupled to an audio input device and the linguistic analysis circuitry is to provide feedback to the user in response to a signal from the audio input device, the signal indicative of a second language response by the user to the second language education output, the feedback including at least one of information on: correct/incorrect second language word choice; correct/incorrect second language word pronunciation; correct/incorrect second language word usage; correct/incorrect second language grammar; or correct/incorrect second language word tone or accent.

6. The system of claim 1, wherein:
the context determination circuitry is to determine one or more personal contextual parameters associated with a person conversing with the user based on the sensor information; and
the linguistic analysis circuitry is to associate the identified object with a second language based on the one or more personal contextual parameters, the one or more personal contextual parameters including at least one of: an age of the person conversing with the user; a gender of the person conversing with the user; or a social status of the person conversing with the user.

7. The system of claim 1, wherein:
the context determination circuitry is to determine one or more environmental contextual parameters associated with an environment based on the sensor information; and
the linguistic analysis circuitry is to associate the identified object with a second language based on the one or more environmental contextual parameters, the one or more environmental contextual parameters including at least one of: a location where silence is expected; an event where silence is expected; a location where high ambient light levels precludes use of a second language visual output; a formal location where colloquial language is not acceptable; or an informal location where colloquial language is acceptable.

8. A non-transitory storage device including machine-readable instructions that, when executed by language education circuitry, cause the language education circuitry to:
  receive sensor information responsive to a request to initiate a second language education event;
  determine a second language context based on the sensor information;
  determine an identity of a user;
  determine one or more second language parameters associated with the user;
  detect an object disposed in an environment including the user based on sensor information; and
  identify the detected object;
  initiate the second language education event using the sensor information, the second language context, the one or more second language parameters, and the identified object; and
  generate a second language education output based on the received sensor information and the determined second language context by:
    generating a signal that includes a visual second language education output associated with the identified object; and
    outputting the signal to a projector to cause the projector to project the visual second language education output on a surface proximate the identified object.

9. The non-transitory storage device of claim 8, wherein the machine-readable instructions, when executed, cause the language education circuitry to associate the identified object with the second language based on the one or more second language parameters.

10. The non-transitory storage device of claim 8, wherein the machine-readable instructions, when executed, cause the language education circuitry to determine the identity of the user based on the sensor information, the sensor information including one or more biometric parameters.

11. The non-transitory storage device of claim 8, wherein the second language education output includes an audible second language education output and the machine-readable instructions, when executed, cause the language education circuitry to:
  cause a signal including the audible second language education output to be generated; and
  cause the signal to be transmitted to a loudspeaker.

12. The non-transitory storage device of claim 8, wherein the machine-readable instructions, when executed, cause the language education circuitry to:
  generate an output signal that includes information representative of feedback to the user in response to an input signal from an audio input device, the input signal indicative of a second language response by the user to the second language education output, the feedback including at least one of information on: correct/incorrect second language word choice; correct/incorrect second language word pronunciation; correct/incorrect second language word usage; correct/incorrect second language grammar; or correct/incorrect second language word tone or accent.

13. The non-transitory storage device of claim 8, wherein the machine-readable instructions, when executed, cause the language education circuitry to:
- determine one or more personal contextual parameters associated with a person conversing with the user based on the sensor information, the one or more personal contextual parameters including at least one of: an age of the person conversing with the user; a gender of the person conversing with the user; or a social status of the person conversing with the user; and
- associate the identified object with a second language based on the one or more personal contextual parameters.

14. The non-transitory storage device of claim 8, wherein the machine-readable instructions, when executed, cause the language education circuitry to:
- determine one or more environmental contextual parameters associated with the environment based on the sensor information, the one or more environmental contextual parameters including at least one of: a location where silence is expected; an event where silence is expected; a location where high ambient light levels precludes use of a second language event visual output; a formal location where colloquial language is not acceptable; or an informal location where colloquial language is acceptable; and
- associate the identified object with a second language based on the one or more environmental contextual parameters.

15. A language education system comprising:
- means for receiving sensor information;
- means for determining a second language context based on the received sensor information;
- means for determining an identity of a user and one or more second language parameters associated with the user;
- means for detecting an object disposed in an environment including the user based on the sensor information, the detecting means to identify the detected object;
- means for initiating a second language education event using the sensor information, the second language context, the one or more second language parameters, and the identified object;
- means for generating a second language education output based on the received sensor information and the determined second language context by generating a signal that includes a visual second language education output associated with the identified object; and
- means for outputting the second language education output, the outputting means to output to a projector to cause the projector to project the visual second language education output on a surface proximate the identified object.

16. The system of claim 15, further including means for associating the identified object with the second language based on the one or more second language parameters.

17. The system of claim 15, wherein the identity determining means is to determine the identity of the user based on the sensor information, the sensor information including one or more biometric parameters.

* * * * *